(12) United States Patent
Ly et al.

(10) Patent No.: US 11,659,575 B2
(45) Date of Patent: May 23, 2023

(54) PHASE COHERENT DEMODULATION REFERENCE SIGNAL TECHNIQUES FOR CROSS-SLOT CHANNEL ESTIMATION

(71) Applicant: QUALCOMM Incorporated, San Diego, CA (US)

(72) Inventors: Hung Dinh Ly, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 17/163,277

(22) Filed: Jan. 29, 2021

(65) Prior Publication Data

US 2022/0248405 A1    Aug. 4, 2022

(51) Int. Cl.
*H04W 4/00* (2018.01)
*H04W 72/04* (2023.01)
(Continued)

(52) U.S. Cl.
CPC ....... *H04W 72/0493* (2013.01); *H04L 5/0048* (2013.01); *H04W 72/042* (2013.01); *H04W 72/0446* (2013.01)

(58) Field of Classification Search
CPC ........... H04W 72/0493; H04W 72/042; H04W 72/0446; H04L 5/0048; H04L 5/001
See application file for complete search history.

(56) References Cited

U.S. PATENT DOCUMENTS 11,394,517 B2 *   7/2022  Huang ............... H04W 72/1268
11,497,027 B2 *  11/2022  Ly ....................... H04W 72/042
(Continued)

OTHER PUBLICATIONS

Ericsson: "Joint Channel Estimation for Pusch", 3GPP Draft, 3GPP TSG-RAN WG1 Meeting #104-e, R1-2101522, 3rd Generation Partnership Project (3GPP), Mobile Competence Centre, 650, Route Des Lucioles, F-06921 Sophia-Antipolis Cedex, France, vol. RAN WG1, No. E-Meeting, Jan. 25, 2021-Feb. 5, 2021 Jan. 19, 2021 (Jan. 19, 2021), XP051971683, 7 Pages, Retrieved from the Internet: URL: https://ftp.3gpp.org/tsg_ran/WG1_RL1/TSGR1_104-e/Docs/R1-2101522.zip R1-2101522 Joint Channel Estimation for PUSCH.docx [retrieved on Jan. 19, 2021] Sections 1 to 3.
International Search Report and Written Opinion—PCT/US2021/072594—ISA/EPO—dated Mar. 28, 2022.
(Continued)

*Primary Examiner* — Abdelnabi O Musa
(74) *Attorney, Agent, or Firm* — Holland & Hart LLP

(57) ABSTRACT

Methods, systems, and devices for wireless communications are described. A user equipment (UE) may receive, from a base station, control signaling indicating a set of resources for transmitting a set of uplink shared channel transmissions and a set of demodulation reference signals (DMRSs) having phase coherence across a set of transmission time intervals (TTIs). The UE may receive, from the base station, a control message indicating a cancellation of a first resource of the set of resources. The UE may determine one or more phase-continuity conditions for the set of resources based on receiving the control message indicating the cancellation of the first resource. The UE may transmit, in remaining resources of the set of resources, at least a subset of the set of uplink shared channel transmissions and at least a subset of the set of DMRSs in accordance with the one or more phase-continuity conditions.

30 Claims, 18 Drawing Sheets

(51) Int. Cl.
  *H04L 5/00* (2006.01)
  *H04W 72/0446* (2023.01)

(56) References Cited

U.S. PATENT DOCUMENTS

| | | | | |
|---|---|---|---|---|
| 2014/0056188 | A1* | 2/2014 | Yang | H04L 5/14 370/280 |
| 2018/0063820 | A1* | 3/2018 | Xiong | H04W 72/042 |
| 2018/0323935 | A1* | 11/2018 | Yerramalli | H04W 72/042 |
| 2019/0124643 | A1* | 4/2019 | Qin | H04L 5/0048 |
| 2019/0159181 | A1* | 5/2019 | Manolakos | H04B 7/0617 |
| 2019/0222379 | A1* | 7/2019 | Kim | H04L 5/0048 |
| 2019/0297629 | A1* | 9/2019 | Lin | H04W 72/042 |
| 2019/0327051 | A1* | 10/2019 | Patel | H04L 5/0053 |
| 2020/0106588 | A1* | 4/2020 | Gulati | H04L 1/0033 |
| 2020/0220701 | A1* | 7/2020 | Tang | H04W 72/02 |
| 2020/0259601 | A1* | 8/2020 | Zhou | H04W 76/11 |
| 2020/0351892 | A1* | 11/2020 | Yi | H04L 5/0044 |
| 2020/0403768 | A1* | 12/2020 | Manolakos | H04W 72/1263 |
| 2021/0014095 | A1* | 1/2021 | Ly | H04W 72/042 |
| 2021/0376985 | A1* | 12/2021 | Zhou | H04L 5/0053 |

OTHER PUBLICATIONS

Moderator (China Telecom): "[103-e-NR-CovEnh-04] Summary of Email Discussion on PUSCH", 3GPP Draft, 3GPP TSG RAN WG1 Meeting #103-e, R1-2009814, 3rd Generation Partnership Project (3GPP), Mobile Competence Centre, 650, Route Des Lucioles, F-06921 Sophia-Antipolis Cedex, France, vol. RAN WG1, No. E-Meeting, Oct. 26, 2020-Nov. 13, 2020 Nov. 19, 2020 (Nov. 19, 2020), XP051955965, 204 Pages, Retrieved from the Internet: URL: https://ftp.3gpp.org/tsg_ran/WG1_RL1/TSGR1_103-e/Docs/R1-2009814.zip R1-2009814—[103-e-NR-CovEnh-04].docx [retrieved on Nov. 19, 2020] the whole document.

Nokia, et al., "Joint Channel Estimation for PUSCH Coverage Enhancements", 3GPP Draft, 3GPP TSG RAN WG1 #104-e, R1-2101712, 3rd Generation Partnership Project (3GPP), Mobile Competence Centre, 650, Route Des Lucioles, F-06921 Sophia-Antipolis Cedex, France, vol. RAN WG1, No. E-Meeting, Jan. 25, 2021-Feb. 5, 2021 Jan. 18, 2021 (Jan. 18, 2021), XP051971865, 5 Pages, Retrieved from the Internet: URL: https://ftp.3gpp.org/tsg_ran/WG1_RL1/TSGR1_104-e/Docs/R1-2101712.zip R1-2101712 Joint Channel Estimation for PUSCH Coverage Enhancements.docx [retrieved on Jan. 18, 2021] Section 1 to 2.3.

* cited by examiner

PHASE COHERENT DEMODULATION REFERENCE SIGNAL TECHNIQUES FOR CROSS-SLOT CHANNEL ESTIMATION

FIELD OF TECHNOLOGY

The following relates to wireless communications, including techniques for cross-slot channel estimation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may bundle phase-coherent demodulation reference signals (DMRSs) in order to improve channel estimation and improve a reliability of wireless communications. For example, some UEs may coherently transmit DMRSs across multiple slots in conjunction with multiple physical uplink shared channel (PUSCH) transmissions to enable the base station to aggregate the DMRSs, perform more accurate channel estimation, and demodulate the PUSCH transmissions.

SUMMARY

The described techniques relate to improved methods, systems, devices, and apparatuses that support techniques for cross-slot channel estimation. Generally, the present disclosure provides techniques for signaling and/or configuring phase-continuity conditions for maintaining phase continuity (e.g., phase coherence) across demodulation reference signals (DMRSs) which are bundled across multiple physical uplink shared channel (PUSCH) transmissions. In particular, a user equipment (UE) may be configured with one or more phase-continuity conditions which define whether phase-continuity is maintained (or not maintained) across DMRSs bundled across multiple PUSCH transmissions and/or multiple slots in the event resources allocated for the DMRS are canceled or revoked. For example, a UE may receive an allocation of resources for transmitting a set of PUSCH transmissions and a set of DMRSs having phase continuity across multiple the set of PUSCH transmissions, across multiple slots, or both. Subsequently, a portion of the allocated resources may be canceled or revoked. In this example, the UE may determine one or more phase-continuity conditions for the remaining, non-canceled resources, and may transmit the PUSCH transmissions and DMRSs within the non-canceled resources in accordance with the one or more determined phase-continuity conditions. Subsequently, the base station may be configured to aggregate at least a subset of the DMRSs to perform channel estimation, and may demodulate (decode) the PUSCH transmissions based on the channel estimate.

A method for wireless communication at a UE is described. The method may include receiving, from a base station, control signaling indicating a set of multiple resources for transmitting a set of multiple uplink shared channel transmissions and a set of multiple DMRSs having phase continuity across a set of multiple transmission time intervals (TTIs), receiving, from the base station, a control message indicating a cancellation of a first resource of the set of multiple resources, determining one or more phase-continuity conditions for the set of multiple resources based on receiving the control message indicating the cancellation of the first resource, and transmitting, in one or more remaining resources of the set of multiple resources, at least a subset of the set of multiple uplink shared channel transmissions and at least a subset of the set of multiple DMRSs in accordance with the one or more phase-continuity conditions.

An apparatus for wireless communication at a UE is described. The apparatus may include a processor, memory coupled with the processor, and instructions stored in the memory. The instructions may be executable by the processor to cause the apparatus to receive, from a base station, control signaling indicating a set of multiple resources for transmitting a set of multiple uplink shared channel transmissions and a set of multiple DMRSs having phase continuity across a set of multiple TTIs, receive, from the base station, a control message indicating a cancellation of a first resource of the set of multiple resources, determine one or more phase-continuity conditions for the set of multiple resources based on receiving the control message indicating the cancellation of the first resource, and transmit, in one or more remaining resources of the set of multiple resources, at least a subset of the set of multiple uplink shared channel transmissions and at least a subset of the set of multiple DMRSs in accordance with the one or more phase-continuity conditions.

Another apparatus for wireless communication at a UE is described. The apparatus may include means for receiving, from a base station, control signaling indicating a set of multiple resources for transmitting a set of multiple uplink shared channel transmissions and a set of multiple DMRSs having phase continuity across a set of multiple TTIs, means for receiving, from the base station, a control message indicating a cancellation of a first resource of the set of multiple resources, means for determining one or more phase-continuity conditions for the set of multiple resources based on receiving the control message indicating the cancellation of the first resource, and means for transmitting, in one or more remaining resources of the set of multiple resources, at least a subset of the set of multiple uplink shared channel transmissions and at least a subset of the set of multiple DMRSs in accordance with the one or more phase-continuity conditions.

A non-transitory computer-readable medium storing code for wireless communication at a UE is described. The code may include instructions executable by a processor to receive, from a base station, control signaling indicating a set of multiple resources for transmitting a set of multiple uplink shared channel transmissions and a set of multiple DMRSs having phase continuity across a set of multiple TTIs, receive, from the base station, a control message indicating a cancellation of a first resource of the set of multiple resources, determine one or more phase-continuity conditions for the set of multiple resources based on receiving the control message indicating the cancellation of the first resource, and transmit, in one or more remaining resources of the set of multiple resources, at least a subset of the set of multiple uplink shared channel transmissions and at least a subset of the set of multiple DMRSs in accordance with the one or more phase-continuity conditions.

Some examples of the method, apparatuses, and non-transitory computer-readable medium described herein may further include operations, features, means, or instructions for transmitting the subset of the set of multiple DMRSs having phase continuity across the set of multiple TTIs based on a time duration between a beginning of the first resource and a next uplink shared channel transmission of the set of multiple uplink shared channel transmissions satisfying a threshold time interval.

In some examples of the method, apparatuses, and non-transitory computer-readable medium described herein, the threshold time interval includes a quantity of symbol periods.

Some examples of the method, apparatuses, and non-transitory computer-readable medium described herein may further include operations, features, means, or instructions for receiving, from the base station, an indication of the threshold time interval.

Some examples of the method, apparatuses, and non-transitory computer-readable medium described herein may further include operations, features, means, or instructions for transmitting, to the base station, an indication of the threshold time interval.

In some examples of the method, apparatuses, and non-transitory computer-readable medium described herein, the transmitting may include operations, features, means, or instructions for transmitting a first subset of the set of multiple DMRSs having a first phase coherency and a second subset of the set of multiple DMRSs having a second phase coherency based on a time duration between a beginning of the first resource and a next uplink shared channel transmission of the set of multiple uplink shared channel transmissions not satisfying a threshold time interval.

In some examples of the method, apparatuses, and non-transitory computer-readable medium described herein, the first subset of the set of multiple DMRSs may be transmitted prior to the first resource, and the second subset of the set of multiple DMRSs may be transmitted subsequent to the first resource.

In some examples of the method, apparatuses, and non-transitory computer-readable medium described herein, the transmitting may include operations, features, means, or instructions for transmitting a first subset of the set of multiple DMRSs having a first phase coherency and a second subset of the set of multiple DMRSs having a second phase coherency based on the first resource including one or more symbols allocated for one of the set of multiple DMRSs.

In some examples of the method, apparatuses, and non-transitory computer-readable medium described herein, the one or more symbols allocated for the set of multiple DMRSs include all symbols allocated for the set of multiple DMRSs within a TTI of the set of multiple TTIs.

In some examples of the method, apparatuses, and non-transitory computer-readable medium described herein, the transmitting may include operations, features, means, or instructions for transmitting the subset of the set of multiple DMRSs having phase coherency across the set of multiple TTIs based on the first resource not including any symbols allocated for the set of multiple DMRSs.

Some examples of the method, apparatuses, and non-transitory computer-readable medium described herein may further include operations, features, means, or instructions for transmitting, to the base station, an indication of one or more phase-continuity conditions supported by the UE, where receiving the control message, determining the one or more phase-continuity conditions, or both, may be based on transmitting the indication of one or more phase-continuity conditions supported by the UE.

In some examples of the method, apparatuses, and non-transitory computer-readable medium described herein, the set of multiple resources, for each TTI of the set of multiple TTIs, includes a first subset of resources allocated for the set of multiple uplink shared channel transmissions and second subset of resources allocated for the set of multiple DMRSs.

In some examples of the method, apparatuses, and non-transitory computer-readable medium described herein, the set of multiple uplink shared channel transmissions include a set of multiple repetitions of a same uplink shared channel transmission.

In some examples of the method, apparatuses, and non-transitory computer-readable medium described herein, the set of multiple uplink shared channel transmissions include a first uplink shared channel transmission and a second uplink shared channel transmission different from the first uplink shared channel transmission.

In some examples of the method, apparatuses, and non-transitory computer-readable medium described herein, the set of multiple TTIs includes a set of multiple slots.

In some examples of the method, apparatuses, and non-transitory computer-readable medium described herein, the control message indicating the cancellation includes an uplink cancellation indication message.

A method for wireless communication at a base station is described. The method may include transmitting, to a UE, control signaling indicating a set of multiple resources for transmitting a set of multiple uplink shared channel transmissions and a set of multiple DMRSs having phase continuity across a set of multiple TTIs, transmitting, to the UE, a control message indicating a cancellation of a first resource of the set of multiple resources, determining one or more phase-continuity conditions for the set of multiple resources based on transmitting the control message indicating the cancellation of the first resource, and receiving, in one or more remaining resources of the set of multiple resources, at least a subset of the set of multiple uplink shared channel transmissions and at least a subset of the set of multiple DMRSs in accordance with the one or more phase-continuity conditions.

An apparatus for wireless communication at a base station is described. The apparatus may include a processor, memory coupled with the processor, and instructions stored in the memory. The instructions may be executable by the processor to cause the apparatus to transmit, to a UE, control signaling indicating a set of multiple resources for transmitting a set of multiple uplink shared channel transmissions and a set of multiple DMRSs having phase continuity across a set of multiple TTIs, transmit, to the UE, a control message indicating a cancellation of a first resource of the set of multiple resources, determine one or more phase-continuity conditions for the set of multiple resources based on transmitting the control message indicating the cancellation of the first resource, and receive, in one or more remaining resources of the set of multiple resources, at least a subset of the set of multiple uplink shared channel transmissions and at least a subset of the set of multiple DMRSs in accordance with the one or more phase-continuity conditions.

Another apparatus for wireless communication at a base station is described. The apparatus may include means for transmitting, to a UE, control signaling indicating a set of multiple resources for transmitting a set of multiple uplink shared channel transmissions and a set of multiple DMRSs having phase continuity across a set of multiple TTIs, means for transmitting, to the UE, a control message indicating a cancellation of a first resource of the set of multiple resources, means for determining one or more phase-continuity conditions for the set of multiple resources based on transmitting the control message indicating the cancellation of the first resource, and means for receiving, in one or more remaining resources of the set of multiple resources, at least a subset of the set of multiple uplink shared channel transmissions and at least a subset of the set of multiple DMRSs in accordance with the one or more phase-continuity conditions.

A non-transitory computer-readable medium storing code for wireless communication at a base station is described. The code may include instructions executable by a processor to transmit, to a UE, control signaling indicating a set of multiple resources for transmitting a set of multiple uplink shared channel transmissions and a set of multiple DMRSs having phase continuity across a set of multiple TTIs, transmit, to the UE, a control message indicating a cancellation of a first resource of the set of multiple resources, determine one or more phase-continuity conditions for the set of multiple resources based on transmitting the control message indicating the cancellation of the first resource, and receive, in one or more remaining resources of the set of multiple resources, at least a subset of the set of multiple uplink shared channel transmissions and at least a subset of the set of multiple DMRSs in accordance with the one or more phase-continuity conditions.

Some examples of the method, apparatuses, and non-transitory computer-readable medium described herein may further include operations, features, means, or instructions for receiving the subset of the set of multiple DMRSs having phase continuity across the set of multiple TTIs based on a time duration between a beginning of the first resource and a next uplink shared channel transmission of the set of multiple uplink shared channel transmissions satisfying a threshold time interval.

In some examples of the method, apparatuses, and non-transitory computer-readable medium described herein, the threshold time interval includes a quantity of symbol periods.

Some examples of the method, apparatuses, and non-transitory computer-readable medium described herein may further include operations, features, means, or instructions for transmitting, to the UE, an indication of the threshold time interval.

Some examples of the method, apparatuses, and non-transitory computer-readable medium described herein may further include operations, features, means, or instructions for receiving, from the UE, an indication of the threshold time interval.

In some examples of the method, apparatuses, and non-transitory computer-readable medium described herein, the receiving may include operations, features, means, or instructions for receiving a first subset of the set of multiple DMRSs having a first phase coherency and a second subset of the set of multiple DMRSs having a second phase coherency based on a time duration between a beginning of the first resource and a next uplink shared channel transmission of the set of multiple uplink shared channel transmissions not satisfying a threshold time interval.

In some examples of the method, apparatuses, and non-transitory computer-readable medium described herein, the first subset of the set of multiple DMRSs may be received prior to the first resource, and the second subset of the set of multiple DMRSs may be received subsequent to the first resource.

In some examples of the method, apparatuses, and non-transitory computer-readable medium described herein, the receiving may include operations, features, means, or instructions for receiving a first subset of the set of multiple DMRSs having a first phase coherency and a second subset of the set of multiple DMRSs having a second phase coherency based on the first resource including one or more symbols allocated for one of the set of multiple DMRSs.

In some examples of the method, apparatuses, and non-transitory computer-readable medium described herein, the one or more symbols allocated for the set of multiple DMRSs include all symbols allocated for the set of multiple DMRSs within a TTI of the set of multiple TTIs.

In some examples of the method, apparatuses, and non-transitory computer-readable medium described herein, the receiving may include operations, features, means, or instructions for receiving the subset of the set of multiple DMRSs having phase coherency across the set of multiple TTIs based on the first resource not including any symbols allocated for the set of multiple DMRSs.

Some examples of the method, apparatuses, and non-transitory computer-readable medium described herein may further include operations, features, means, or instructions for receiving, from the UE, an indication of one or more phase-continuity conditions supported by the UE, where transmitting the control message, determining the one or more phase-continuity conditions, or both, may be based on receiving the indication of one or more phase-continuity conditions supported by the UE.

In some examples of the method, apparatuses, and non-transitory computer-readable medium described herein, the set of multiple resources, for each TTI of the set of multiple TTIs, includes a first subset of resources allocated for the set of multiple uplink shared channel transmissions and second subset of resources allocated for the set of multiple DMRSs.

In some examples of the method, apparatuses, and non-transitory computer-readable medium described herein, the set of multiple uplink shared channel transmissions include a set of multiple repetitions of a same uplink shared channel transmission, or and the set of multiple uplink shared channel transmissions include a first uplink shared channel transmission and a second uplink shared channel transmission different from the first uplink shared channel transmission.

Some examples of the method, apparatuses, and non-transitory computer-readable medium described herein may further include operations, features, means, or instructions for determining a channel estimate based on aggregating the subset of the set of multiple DMRSs and demodulating the subset of the set of multiple uplink shared channel transmissions based on the channel estimate.

DETAILED DESCRIPTION

Figure 1:
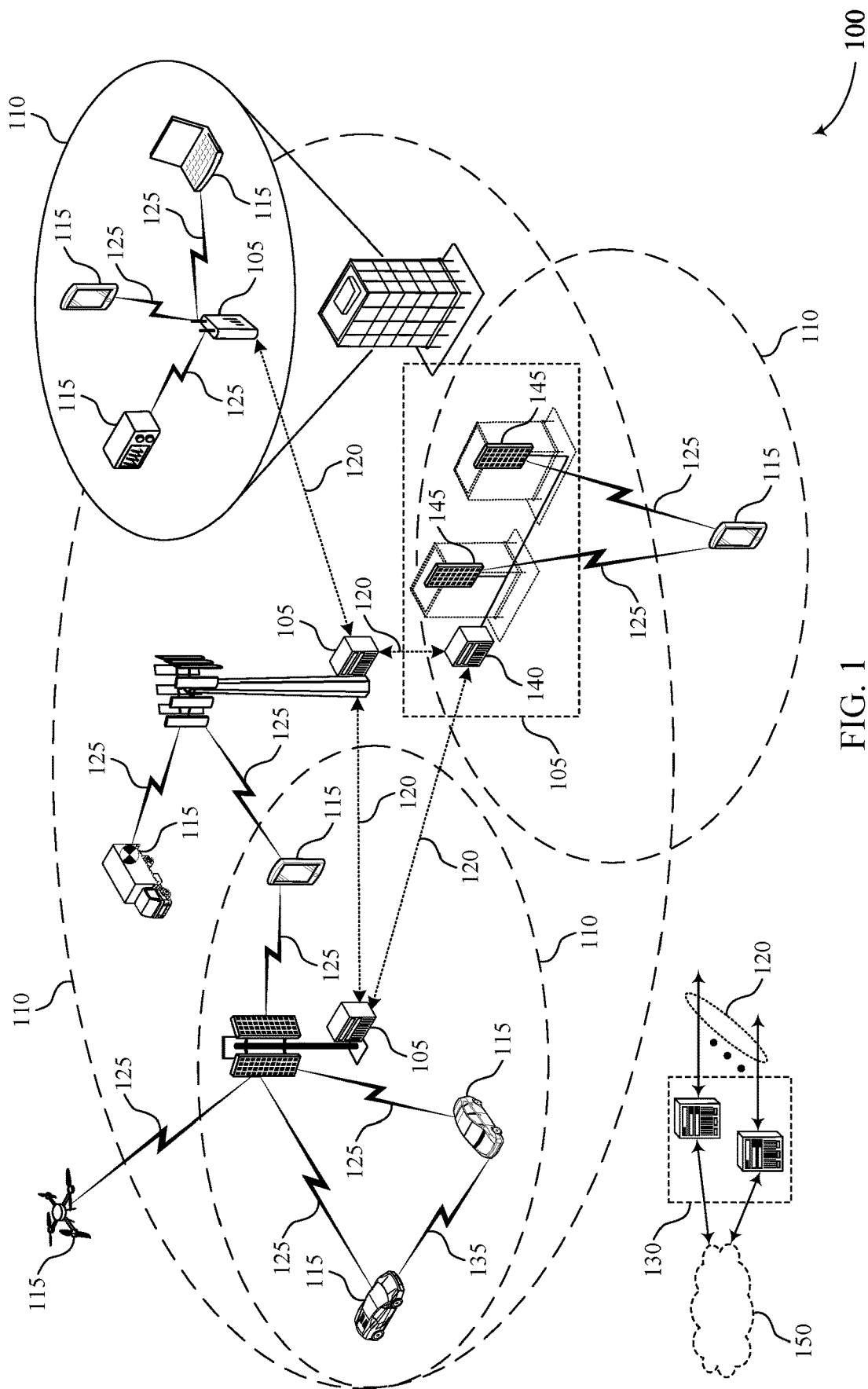
FIG. 1 illustrates an example of a wireless communications system that supports techniques for cross-slot channel estimation in accordance with aspects of the present disclosure.

Some wireless communications systems may bundle phase-coherent demodulation reference signals (DMRSs) in order to improve channel estimation and improve a reliability of wireless communications. For example, some user equipments (UEs) may transmit DMRSs having phase continuity across multiple slots in conjunction with bundled uplink shared channel transmissions (e.g., physical uplink shared channel (PUSCH) repetitions) to enable the base station to aggregate the DMRSs, perform more accurate channel estimation, and demodulate the uplink shared channel transmissions. In some cases, DMRSs having phase-continuity across multiple slots and/or multiple transmissions may be said to be "bundled" across the multiple slots and/or multiple transmissions. However, current wireless communications systems do not provide rules or other configurations which instruct the UEs to maintain (or not maintain) phase-continuity (e.g., phase coherence) for DMRSs bundled across multiple slots in the event that some of the resources allocated for the DMRSs or other uplink transmissions are canceled. For example, a UE may receive an allocation of resources for coherently transmitting a set of PUSCH transmissions and a set of phase-coherent DMRSs across multiple slots. In this example, if a portion of the resources is subsequently canceled or revoked, it is unclear whether the UE is expected to maintain phase coherency across the DMRSs or not.

Accordingly, aspects of the present disclosure are directed to techniques for signaling and/or configuring phase-continuity conditions for maintaining phase continuity across DMRSs which are bundled across multiple PUSCH transmissions and/or multiple slots. Moreover, for the purposes of the present disclosure, the terms "phase-continuity," "phase-coherence," and like terms, may be used interchangeably. According to some aspects of the present disclosure, UEs may be configured with multiple phase-continuity conditions which define sets of rules for whether phase-continuity is maintained (or not maintained) across DMRSs which are bundled across multiple PUSCH transmissions and/or multiple slots in the event resources allocated for the DMRS are canceled or revoked.

For example, a UE may receive an allocation of resources for coherently transmitting a set of PUSCH transmissions and a set of DMRSs having phase continuity across multiple slots, across the set of PUSCH transmissions, or both. In such cases, the UE may be configured to transmit both the set of PUSCH transmissions and the associated DMRSs with phase continuity across the multiple slots. Subsequently, a portion of the allocated resources may be canceled or revoked. In this example, the UE may determine one or more phase-continuity conditions for the remaining, non-canceled resources, and may transmit the PUSCH transmissions and DMRSs within the non-canceled resources in accordance with the determined phase-continuity conditions. Subsequently, the base station may aggregate the DMRSs having phase continuity to perform channel estimation (e.g., cross-slot channel estimation), and may demodulate (decode) the PUSCH transmissions having phase continuity based on the channel estimate.

In some aspects, phase-continuity conditions may define a set of rules or conditions which indicate whether phase continuity (e.g., phase coherence) is to be maintained (or not maintained) across DMRSs bundled across multiple slots in the event a portion of allocated resources is canceled or revoked. According to some phase-continuity conditions, phase continuity (e.g., phase coherence) may be maintained for the DMRSs across the multiple PUSCH transmissions and/or multiple slots despite the cancellation of the resources. According to other phase-continuity conditions, phase-continuity may be maintained across all slots if a duration of canceled resources is less than some time threshold. In other phase-continuity conditions, all resources for DMRSs within a slot may be canceled, and the UE may transmit multiple sets of DMRSs with different phase continuities before and after the canceled resources. In some aspects, a UE may be pre-configured with one or more phase-continuity conditions. Additionally or alternatively, the network (e.g., base station) may configure (e.g., signal) one or more phase-continuity conditions to the UE via radio resource control (RRC) signaling. Moreover, the UE may be configured to indicate support for one or more phase-continuity conditions via UE capability messaging.

Aspects of the disclosure are initially described in the context of wireless communications systems. Additional aspects of the disclosure are described in the context of an example resource configurations and an example process flow. Aspects of the disclosure are further illustrated by and described with reference to apparatus diagrams, system diagrams, and flowcharts that relate to techniques for cross-slot channel estimation.

FIG. 1 illustrates an example of a wireless communications system 100 that supports techniques for cross-slot channel estimation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, the UEs 115 and the base stations 105 of the wireless communications system 100 may be configured to support techniques for signaling and/or configuring phase-continuity conditions for maintaining phase-continuity (e.g., phase coherence) across DMRSs which are bundled across multiple PUSCH transmissions, multiple slots, or both. In particular, a UE 115 of the wireless communications system 100 may be configured with multiple phase-continuity conditions which define sets of rules for whether phase-continuity is maintained (or not maintained) across DMRSs bundled across multiple PUSCH transmissions and/or multiple slots in the event resources allocated for the DMRS are canceled or revoked.

For example, a UE 115 may receive, from a base station 105, an allocation of resources for transmitting a set of PUSCH transmissions and a set of DMRSs having phase continuity across a set of one or more slots. In this example, the UE 115 may be configured to transmit the set of PUSCH transmissions and the set of DMRSs with phase continuity across the set of one or more slots. In this regard, the set of DMRSs having phase continuity may said to be bundled across the multiple PUSCH transmissions, across the multiple slots, or both. Subsequently, a portion of the allocated resources may be canceled or revoked. For instance, the base station 105 may transmit an uplink cancelation information (ULCI) message which cancels or revokes a portion of the allocated set of resources. In this example, the UE 115 may determine one or more phase-continuity conditions for the remaining, non-canceled resources, and may transmit the PUSCH transmissions and DMRSs within the non-canceled resources in accordance with the determined phase-continuity conditions.

Subsequently, the base station 105 may aggregate at least a subset of the received DMRSs to perform channel estimation, and may demodulate (decode) the PUSCH transmissions based on the channel estimate.

In some aspects, the phase-continuity conditions may define sets of rules or conditions which indicate whether phase continuity is to be maintained (or not maintained) across DMRSs bundled across multiple PUSCH transmissions and/or multiple slots in the event a portion of allocated resources is canceled or revoked. According to one phase-continuity condition, phase continuity may be maintained for the DMRSs across the multiple PUSCH transmissions and/or multiple slots despite the cancellation of the resources. According to other phase-continuity conditions, phase-continuity may be maintained across all PUSCH transmissions/slots if a duration of canceled resources is less than some time threshold. In other phase-continuity conditions, all resources for DMRSs within a slot may be canceled, and the UE 115 may transmit multiple sets of DMRSs with different phase continuities before and after the canceled resources. In some aspects, a UE 115 may be pre-configured with one or more phase-continuity conditions. In other implementations, the network (e.g., base station 105) may configure (e.g., signal) the UE 115 with one or more phase-continuity conditions via RRC signaling. Moreover, in some cases, a UE 115 may be configured to indicate support for one or more phase-continuity conditions via UE capability messaging.

Techniques described herein may enable UEs 115 to maintain phase continuity across DMRSs bundled across multiple slots. In particular, techniques described herein may enable UEs 115 to maintain some level of phase continuity across DMRSs bundled across multiple PUSCH transmissions and/or multiple slots in the event a portion of resources allocated for the DMRSs and/or other PUSCH transmissions is revoked or canceled. As such, by enabling UEs 115 to maintain phase continuity across DMRSs bundled across multiple transmissions and/or multiple slots, techniques described herein may enable more widespread use of phase-coherent DMRSs (e.g., DMRSs having phase continuity), which may enable more accurate channel estimations at the base station 105, improve a reliability of wireless communications within the wireless communications system 100, and improve overall user experience.

Figure 2:
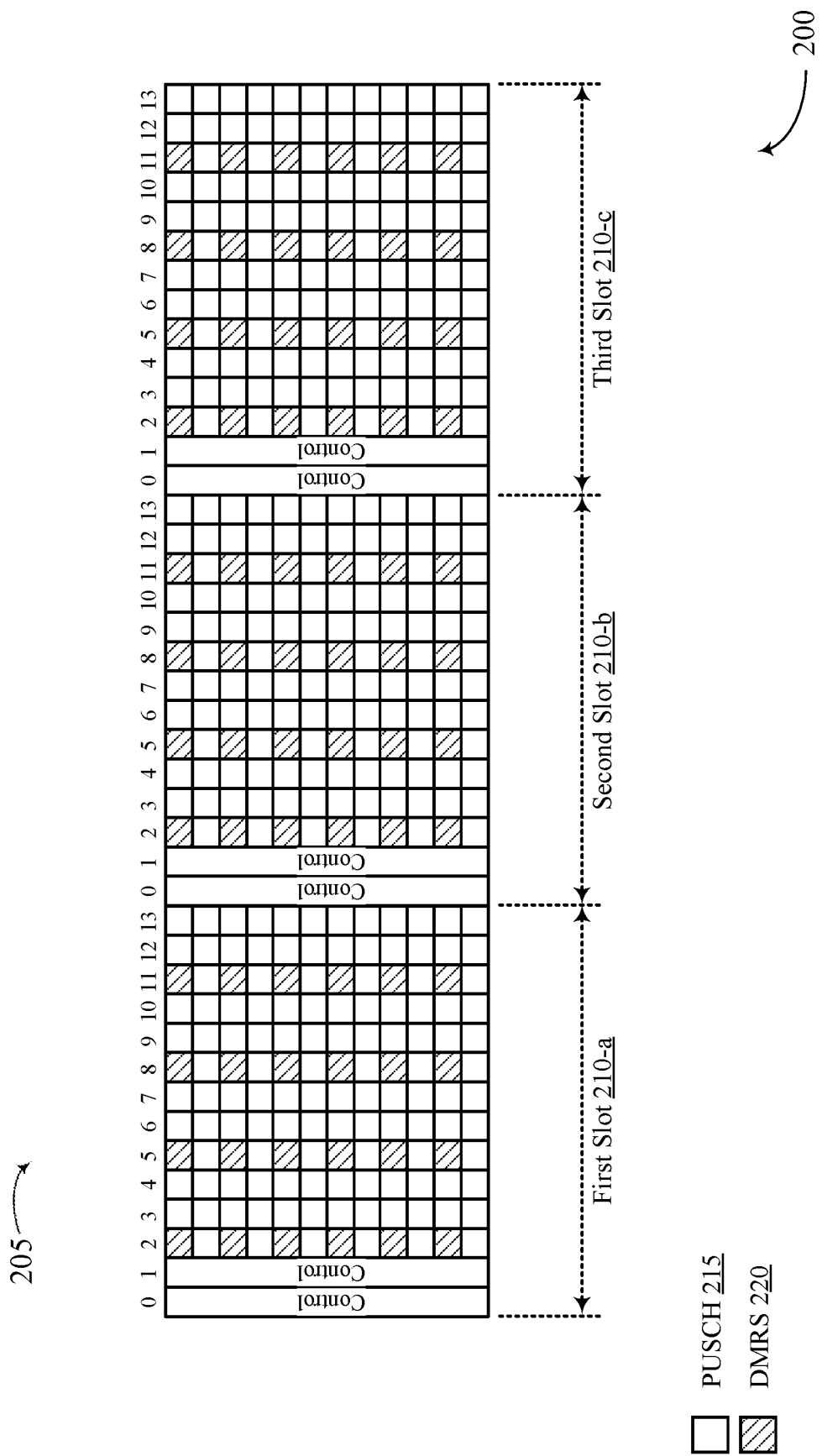
FIG. 2 illustrates an example of a resource configuration that supports techniques for cross-slot channel estimation in accordance with aspects of the present disclosure.

FIG. 2 illustrates an example of a resource configuration 200 that supports techniques for cross-slot channel estimation in accordance with aspects of the present disclosure. In some examples, resource configuration 200 may implement, or be implemented by, aspects of wireless communications system 100. The resource configuration 200 illustrates a set of resources 205 across multiple slots 210 which may be used for transmission/reception of phase-coherent DMRSs.

As noted previously herein, some wireless communications systems (e.g., wireless communications system 100) may enable wireless devices (e.g., UEs 115) to transmit bundled DMRSs 220 having phase continuity (e.g., phase-coherent DMRSs 220) to improve channel estimation. For example, a UE 115 may transmit a set of DMRSs 220 having phase continuity to a base station 105 within a set of resources which are known by both the UE 115 and the base station 105. In this example, because the DMRSs 220 having phase continuity are received by the base station 105 within a set of known resources, the base station 105 may be configured to aggregate the DMRSs 220 having phase continuity to determine a more accurate channel estimation of the channel between the UE 115 and the base station 105. The base station 105 may then be able to use the improved channel estimation to demodulate (e.g., decode) other transmissions (e.g., PUSCH transmissions 215) received from the UE 115 via the channel. In some aspects, the PUSCH transmissions 215 may also be transmitted with phase continuity across the respective slots 210.

Some wireless communications systems have enabled DMRSs 220 to be bundled only within a single TTI, but not across multiple TTIs. For example, in some wireless communications systems, a UE 115 may be configured to transmit a set of DMRSs 220 having phase continuity within the first slot 210-*a*, but may be unable to maintain phase coherency for DMRSs 220 transmitted in different slots 210. For instance, in some wireless communications systems, a UE 115 may be unable to maintain phase continuity across DMRSs 220 which are transmitted within the first slot 210-*a* and the second slot 210-*b*. In this regard, phase continuity may be maintained for DMRSs 220 within each respective slot 210, but may not be maintained for DMRSs 220 across multiple slots 210.

In some other wireless communications systems (e.g., wireless communications system 100), DMRSs 220 may be bundled across multiple slots and/or across multiple transmissions (e.g., PUSCH transmissions), such that phase continuity may be maintained across multiple slots 210 and/or across the multiple transmissions. For example, in the wireless communications system 100, a UE 115 may be configured to transmit a DMRSs 220 within the first slot 210-*a*, the second slot 210-*b*, and the third slot 210-*c*, where phase continuity is maintained across each of the slots 210-*a*, 210-*b*, and 210-*c*. In this example, a base station 105 may be configured to jointly process (e.g., aggregate) the phase-coherent DMRSs 220 received across the slots 210-*a*, 210-*b*, and 210-*c* when performing channel estimation (e.g., cross-slot channel estimation), and may use a determined channel estimate to demodulate the PUSCH transmissions 215 (e.g., PUSCH transmissions 215 having phase continuity) received across the slots 210-*a*, 210-*b*, and 210-*c*.

In some aspects, one or more parameters or characteristics may be maintained for phase-coherent DMRSs 220 which are bundled across one or more slots 210. Parameters which may be used to maintain phase continuity for DMRSs 220 associated with one or more PUSCH transmissions 215 may include, but are not limited to, phase, frequency allocations, transmission powers, spatial transmission relations, antenna ports used for transmission, precoding schemes, and the like. For example, as illustrated in FIG. 2, in cases where DMRSs 220 are bundled across the first slot 210-*a*, the second slot 210-*b*, and the third slot 210-*c*, the frequency allocation and transmit for the DMRSs 220 within each respective slot 210 may remain the same. Conversely, phase-continuity may not be maintained across slots 210 and/or other transmissions (e.g., phase discontinuity) in cases where DMRSs 220 in respective slots 210 exhibit one or more different parameters (e.g., different phases, different frequency resource allocations within or between PUSCH slots, non-contiguous time resource allocation of PUSCH slots, different transmit powers, different antenna ports, different transmission powers, different timing advances).

In some aspects, the ability to bundle DMRSs 220 across multiple slots 210 (e.g., maintain phase coherency for DMRSs 220 across multiple slots 210) and/or across multiple transmissions (e.g., multiple PUSCH transmissions 215) may enable improved channel estimation at a receiving device (e.g., base station 105). In particular, by enabling for larger quantities of DMRSs 220 to be aggregated across multiple slots 210, a base station 105 may be able to determine a more comprehensive channel estimation (e.g., cross-slot channel estimation), which may improve an ability of the base station 105 to demodulate received PUSCH transmissions 215.

Figure 3:
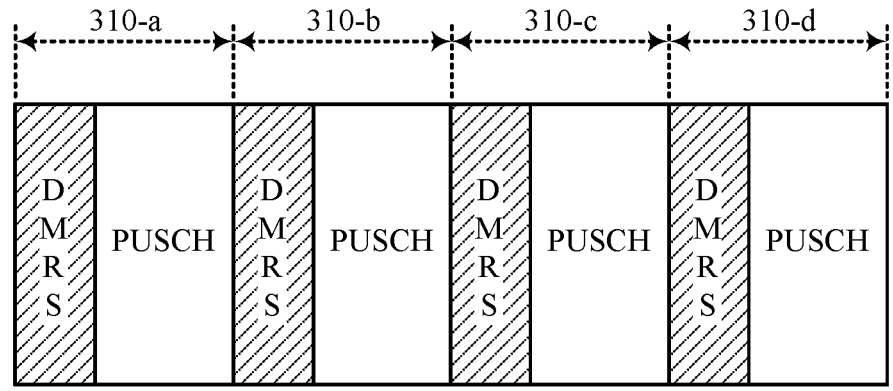
FIG. 3 illustrates an example of a resource configuration that supports techniques for cross-slot channel estimation in accordance with aspects of the present disclosure.
Figure 3:
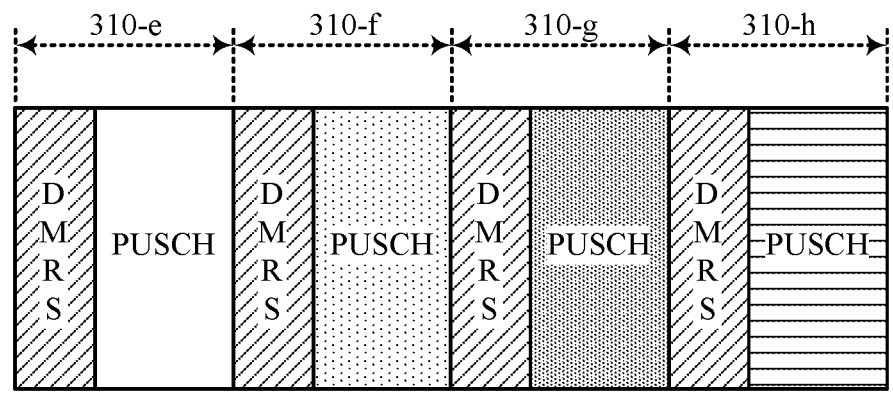

FIG. 3 illustrates an example of a resource configuration 300 that supports techniques for cross-slot channel estimation in accordance with aspects of the present disclosure. In some examples, resource configuration 300 may implement, or be implemented by, aspects of wireless communications system 100, resource configuration 200, or both.

As noted previously herein, bundling DMRSs having phase continuity across one or more slots 310 and/or across one or more PUSCH transmissions may enable a receiving device to aggregate the bundled DMRSs and perform more accurate channel estimation, which may improve demodulation of other received transmissions.

For example, as shown in the resource allocation scheme 305-a, a set of DMRSs having phase continuity (e.g., phase-coherent DMRSs) may be transmitted along with a set of repetitions of a PUSCH transmission across multiple slots 310. In other words, phase continuity is maintained for the bundled DMRSs across the first slot 310-a, the second slot 310-b, the third slot 310-c, and the fourth slot 310-d. Moreover, phase continuity may be maintained for the bundled DMRSs across the respective PUSCH repetitions. In this example, the PUSCH transmissions in each slot 310 may include a repetition of the same PUSCH transmission. In other words, each PUSCH transmission illustrated in the resource allocation scheme 305-a may include the same data payload (e.g., same transport block). The respective PUSCH transmissions may also be transmitted with phase continuity across the respective slots 310. In this example, maintaining phase continuity across the DMRSs bundled across the multiple slots 310 and/or PUSCH transmissions may enable a receiving device (e.g., base station 105) to perform more accurate channel estimation, which may enable the receiving device to more accurately and efficiently demodulate (e.g., decode) the multiple repetitions of the PUSCH transmission.

In additional or alternative aspects, bundling DMRSs having phase continuity across multiple slots may enable efficient demodulation of different PUSCH transmissions. For example, as shown in the resource allocation scheme 305-b, a set of DMRSs having phase continuity may be transmitted along with a set PUSCH transmissions across multiple slots 310. In other words, phase continuity is maintained for the bundled DMRSs across the first slot 310-e, the second slot 310-f, the third slot 310-g, and the fourth slot 310-h. Additionally or alternatively, phase continuity is maintained for the bundled DMRSs across the respective PUSCH transmissions. In this example, the PUSCH transmissions in each slot 310 may include different PUSCH transmissions (e.g., different data payloads, different transport blocks), which may be scheduled by different scheduling grants, DCI messages, and the like. For example, the PUSCH transmission in the first slot 310-e may be different from the PUSCH transmissions in the second slot 310-f, the third slot 310-g, the fourth slot 310-h, or any combination thereof. For instance, the first PUSCH transmission in the first slot 310-a may be scheduled by a first DCI message, and the second PUSCH transmission in the second slot 310-b may be scheduled by a second DCI message. As such, the four PUSCH transmissions within each of the respective slots 310 may include different PUSCH transmissions (e.g., different data payloads, different transport blocks) which are scheduled using different scheduling grants (e.g., four separate DCI messages scheduling the four PUSCH transmissions, respectively). In some cases, the PUSCH transmissions may also be transmitted with phase continuity across the respective slots 310. In this example, maintaining phase continuity across the DMRSs bundled across the multiple slots 310 and/or multiple PUSCH transmissions may enable a receiving device (e.g., base station 105) to perform more accurate channel estimation (e.g., cross-slot channel estimation), which may enable the receiving device to more accurately and efficiently demodulate (e.g., decode) the different PUSCH transmissions received in each respective slot 310.

Figure 4:
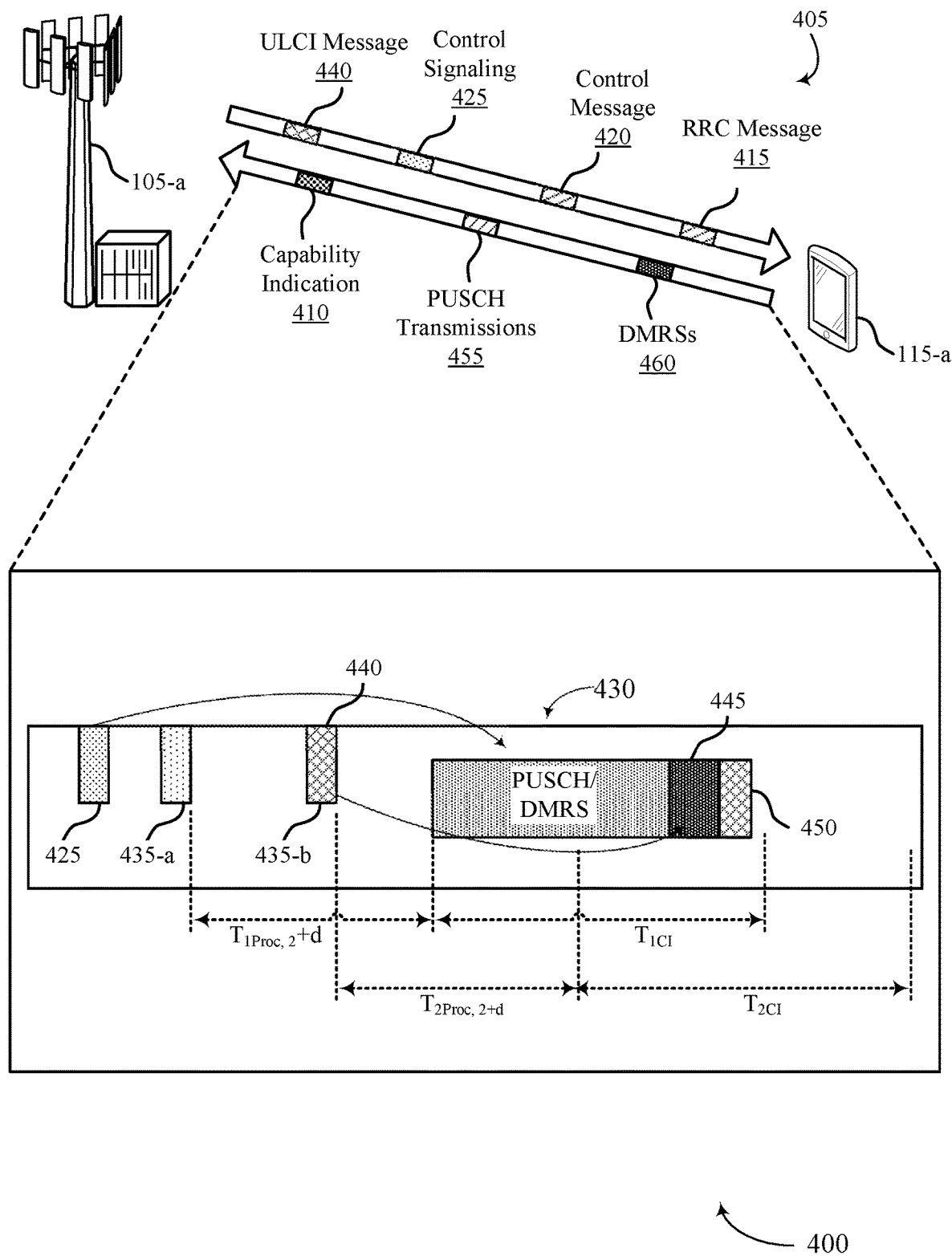
FIG. 4 illustrates an example of a wireless communications system that supports techniques for cross-slot channel estimation in accordance with aspects of the present disclosure.

FIG. 4 illustrates an example of a wireless communications system 400 that supports techniques for cross-slot channel estimation in accordance with aspects of the present disclosure. In some examples, wireless communications system 400 may implement, or be implemented by, aspects of wireless communications system 100, resource configuration 200, resource configuration 300, or any combination thereof. For example, wireless communications system 400 may support one or more phase-continuity conditions for maintaining phase continuity across DMRSs which are bundled across multiple slots, as described with reference to FIGS. 1-3.

The wireless communications system 400 may include a base station 105-a, and a UE 115-a, which may be examples base stations 105 and UEs 115 as described with reference to FIG. 1. The UE 115-a may communicate with the base station 105-a using a communication link 405, which may be an example of an NR or LTE link between the UE 115-a and the base station 105-a. In some cases, the communication link 405 between the UE 115-a and the base station 105-a may include an example of an access link (e.g., Uu link) which may include a bi-directional link that enables both uplink and downlink communication. For example, the UE 115-a may transmit uplink signals, such as uplink control signals or uplink data signals, to the base station 105-a using the communication link 405 and the base station 105-a may transmit downlink signals, such as downlink control signals or downlink data signals, to the UE 115 using the communication link 405.

In some aspects, the UE 115-a and the base station 105-a of the wireless communications system 400 may be configured to support techniques for signaling and/or configuring phase-continuity conditions for maintaining phase-continuity across DMRSs which are bundled across multiple slots and/or multiple transmissions. In particular, the UE 115-a of the wireless communications system 400 may be configured (e.g., pre-configured) with multiple phase-continuity conditions which define sets of rules or conditions for whether phase-continuity is maintained (or not maintained) across DMRSs bundled across multiple slots and/or multiple PUSCH transmissions in the event resources allocated for the DMRSs or PUSCH transmissions are canceled or revoked. By enabling the UE 115-a to maintain some level of phase continuity across bundled DMRSs, the base station 105-a may be able to more accurately and efficiently perform channel estimation over the communication link 405 (e.g., cross-slot channel estimation), thereby improving the likelihood that additional transmissions (e.g., PUSCH transmissions) between the UE 115-a and the base station 105-a will be successfully received and demodulated.

For example, as shown in FIG. 4, the UE 115-a may transmit a capability indication 410 (e.g., UE capability report) to the base station 105-a. The UE 115-a may transmit the capability indication 410 as part of a random access procedure or attachment procedure which is performed with the base station 105-a. In some aspects, the capability indication 410 may indicate one or more phase-continuity conditions which are supported by the UE 115-a. In some aspects, the one or more phase-continuity conditions may be configured (e.g., pre-configured) at the UE 115. In such cases, both the UE 115-a and the base station 105-a may be aware of the phase-continuity conditions which are supported by the UE 115-a.

Figure 5:
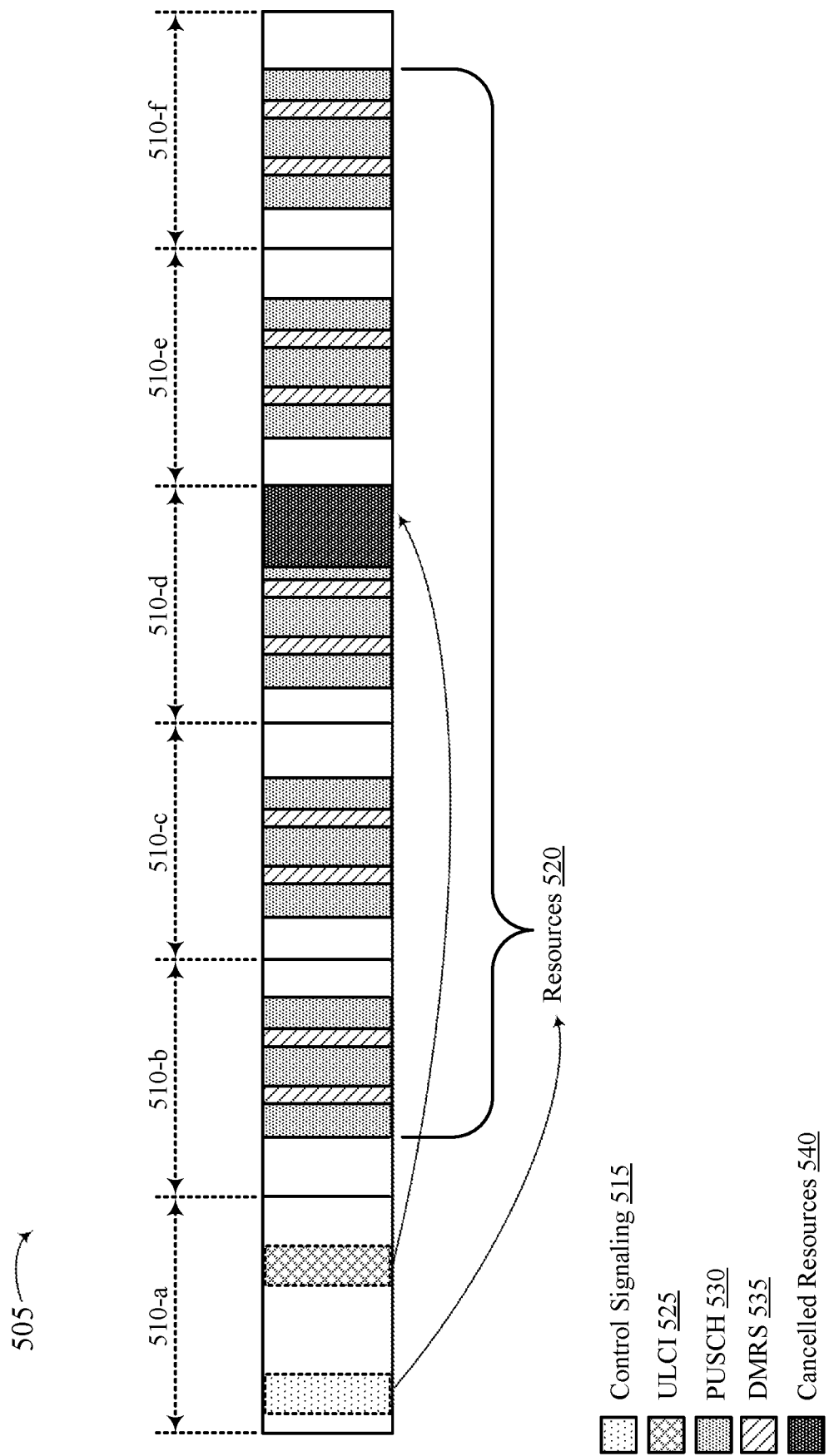
FIG. 5 illustrates an example of a resource configuration that supports techniques for cross-slot channel estimation in accordance with aspects of the present disclosure.
Figure 6:
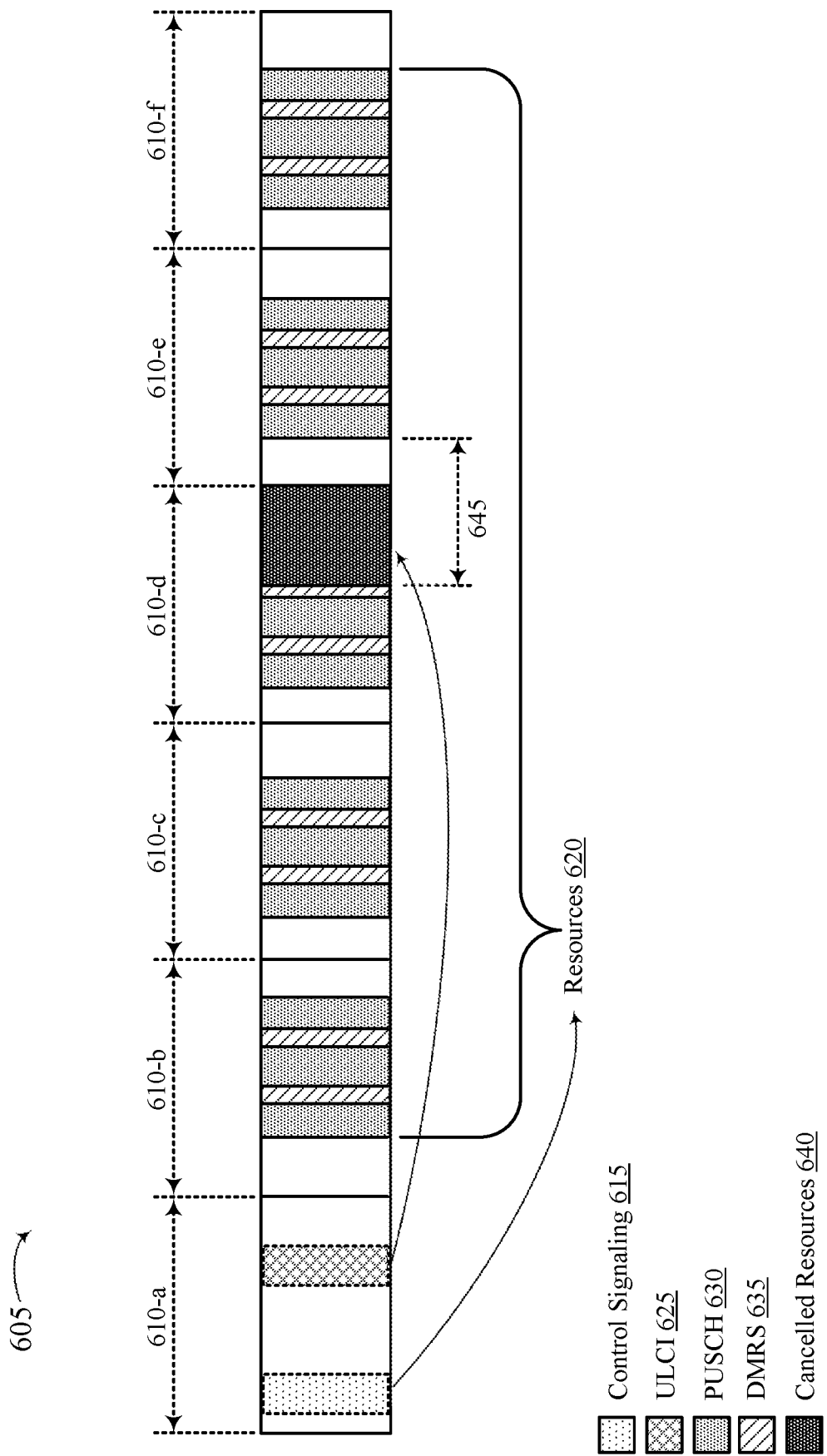
FIG. 6 illustrates an example of a resource configuration that supports techniques for cross-slot channel estimation in accordance with aspects of the present disclosure.
Figure 7:
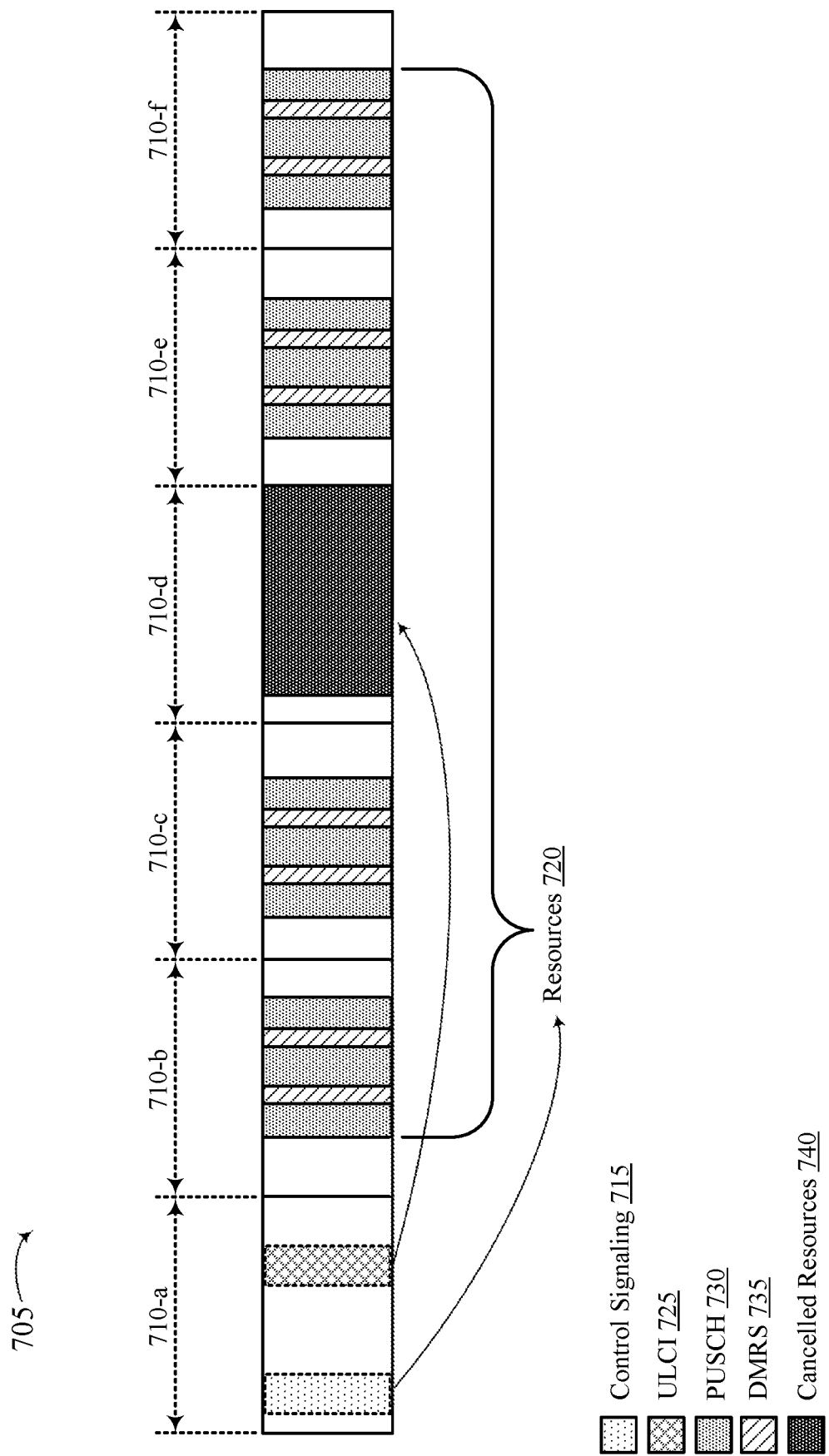
FIG. 7 illustrates an example of a resource configuration that supports techniques for cross-slot channel estimation in accordance with aspects of the present disclosure.

For example, the capability indication 410 may indicate whether or not the UE 115 supports phase-continuity conditions illustrated in FIGS. 5, 6, 7, or any combination thereof. As will be described in further detail with respect to FIGS. 5-7, phase-continuity conditions may define a set of rules or conditions which define whether phase-continuity is maintained (or not maintained) across DMRSs 460 bundled across multiple slots and/or across multiple transmissions. More specifically, phase-continuity conditions may define a set of rules or conditions which define whether phase-continuity is maintained (or not maintained) across DMRSs 460 bundled across multiple slots and/or across multiple other transmissions in the event resources allocated for the DMRSs 460 or other transmissions (e.g., PUSCH transmissions 455) are canceled or revoked.

The capability indication 410 may include additional or alternative information associated with capabilities of the UE 115-a, phase-continuity conditions supported by the UE 115-a, or any combination thereof. For example, as will be described in further detail herein with respect to FIG. 6, phase-continuity conditions illustrated in FIG. 6 may cause the UE 115-a to maintain (or not maintain) phase continuity across bundled DMRSs based on a comparison of a time duration (e.g., time duration 645 illustrated in FIG. 6) associated with canceled resources (e.g., first resource 445) which are canceled by a ULCI message 440 with a threshold time interval. In such cases, the capability indication 410 may indicate the threshold time interval associated with the phase-continuity condition.

In some aspects, the UE 115-a may receive, from the base station 105-a, a control message (e.g., RRC message 415) indicating one or more phase-continuity conditions. For example, the UE 115-a may receive an RRC message 415, where the RRC message 415 configures the UE 115-a with one or more phase-continuity conditions which may be used by the UE 115-a. In some aspects, the base station 105-a may transmit the RRC message 415 indicating the one or more phase-continuity conditions based on (e.g., in response to) receiving the capability indication 410. In cases where the phase-continuity conditions are configured (e.g., pre-configured) at the UE 115-a, the base station 105-a may refrain from transmitting the RRC message 415 indicating the phase-continuity conditions.

In some cases, the RRC message 415 may instruct the UE 115-a as to which phase-continuity condition is to be used (e.g., static indication). In additional or alternative cases, the RRC message 415 may simply configure the UE 115-a with a set of one or more phase-continuity conditions which may be used. In such cases, subsequent control messages (e.g., control message 420) may be used to indicate which phase-continuity conditions of the set of pre-configured phase-continuity conditions is to be used (e.g., dynamic indication). In some aspects, the RRC message 415 may indicate one or more parameters associated with one or more phase-continuity conditions, including, but not limited to, a threshold time interval.

For example, the UE 115-a may receive a control message 420 indicating one or more phase-continuity conditions of the set of pre-configured phase-continuity conditions is to be used. For instance, the control message 420 may include a downlink control information (DCI) message and/or a MAC-CE message which indicates one of the phase-continuity conditions which was configured at the UE 115-a via the RRC message 415. In this regard, the UE 115-a may receive the control message 420 based on transmitting the capability indication 410, receiving the RRC message 415, or both. In some aspects, the control message 420 may indicate one or more parameters associated with one or more phase-continuity conditions, including, but not limited to, a threshold time interval.

In some aspects, the UE 115-a may receive control signaling 425 from the base station 105-a. The UE 115-a may receive the control signaling 425 based on transmitting the capability indication 410, receiving the RRC message 415, receiving the control message 420, or any combination thereof. The control signaling 425 may include an RRC message, a DCI message, or the like. In some aspects, as shown in FIG. 4, the control signaling 425 may indicate a set of resources 430 usable by the UE 115-a for transmitting (e.g., coherently transmitting) a set of uplink shared channel transmissions (e.g., PUSCH transmissions 455) and a set of DMRSs 460 having phase coherence (e.g., phase-coherent DMRSs 460) across a set of TTIs (e.g., slots). As such, the control signaling 425 may allocate a set of resources for transmitting PUSCH transmissions 455 and DMRSs 460 across multiple slots, where the DMRSs 460 are bundled for phase continuity across the multiple slots. In additional or alternative aspects, the PUSCH transmissions 455 scheduled by the control signaling 425 may also be configured to be transmitted with phase continuity across the multiple slots.

In some aspects, the set of resources 430 allocated by the control signaling 425 may include subsets of resources for transmitting both uplink shared channel transmissions (e.g., PUSCH transmissions 455) and DMRSs 460 within each slot of the set of slots. In this regard, the control signaling 425 may schedule a set of PUSCH transmissions 455 having phase continuity and a set of DMRSs 460 having phase continuity across multiple slots. For example, the control signaling 425 may allocate a set of resources 430 for transmitting a set of PUSCH transmissions 455 and a set of DMRSs 460 having phase continuity across a first slot and a second slot. In this example, each of the first and second slots may include subsets of resources allocated for PUSCH transmissions 455 and phase-coherent DMRSs 460, such that one or more PUSCH transmissions 455 having phase continuity and one or more DMRSs 460 having phase continuity may be transmitted in each of the first and second slots.

In some aspects, the set of resources 430 allocated by the control signaling 425 may include resources for multiple repetitions of the same uplink shared channel transmission (e.g., multiple repetitions of the same PUSCH transmission 455), different uplink shared channel transmissions (e.g., different PUSCH transmissions 455), or both.

Subsequently, the UE 115-a may receive, from the base station 105-a, a control message (e.g., ULCI message 440)

indicating a cancelation (e.g., revocation) of a first resource 445 (e.g., subset of resources) of the set of resources 430 which was allocated via the control signaling 425. In some aspects, the ULCI message 440 may include a DCI message (e.g., DCI format 2_4). Additionally or alternatively, the ULCI message 440 may be transmitted using a cancellation information radio network temporary identifier (CI-RNTI). The UE 115-a may receive the ULCI message 440 indicating the cancelation of the first resource 445 based on transmitting the capability indication 410, receiving the RRC message 415, receiving the control message 420, receiving the control signaling 425 allocating the set of resources 430, or any combination thereof.

In some aspects, the UE 115-a may receive the ULCI message 440 indicating the cancellation of the first resource 445 of the set of resources 430 within one or more ULCI monitoring occasions 435. For example, upon receiving the control signaling 425 allocating the set of resources 430, the UE 115-a may be configured to monitor one or more ULCI monitoring occasions 435 (e.g., first ULCI monitoring occasion 435-a, second ULCI monitoring occasion 435-b), and may receive the ULCI message 440 within one of the ULCI monitoring occasions 435 (e.g., second ULCI monitoring occasion 435-b).

In some aspects, the network (e.g., base station 105-b) may utilize ULCI messages 440 in order to reclaim (e.g., cancel) previously-allocated resources such that the reclaimed resources (e.g., first resource 445) may be allocated for different communications, allocated to different wireless devices, or both. In this regard, the use of ULCI messages 440 may improve URLLC within the wireless communications system 400.

In some aspects, resources may be canceled within a cancellation window ($T_{CI}$). In some aspects, the cancellation window within which resources may be canceled may be based on a timing of the ULCI monitoring occasions 435. In particular, cancellation windows may start a duration $T_{Proc,2}+d$ from the end of each ULCI monitoring occasion 435. For example, a first cancellation window $T_{1CI}$ may start a time $T_{1Proc,2}+d$ following an end of the first ULCI monitoring occasion 435-a, and a second cancellation window $T_{2CI}$ may start a time $T_{2Proc,2}+d$ following an end of the second ULCI monitoring occasion 435-b. In some aspects, d may be associated with a capability of the UE 115-a, and may be reported to the base station 105-a via the capability indication 410. To calculate the $T_{1Proc,2}+d$ and $T_{2Proc,2}+d$ terms which are used to identify a beginning of the cancellation windows $T_{1CI}$ and $T_{2CI}$, respectively, $N_2$ of minimum processing capability 2 may be assumed, where a subcarrier spacing (SCS) is the smallest between the SCS configuration of the physical downlink control channel (PDCCH) (e.g., ULCI monitoring occasions 435) and PUSCH and/or sounding reference signals (SRSs) on the serving cell. In some aspects, a minimum processing time capability of 2 may be assumed even for a capability 1 UE 115.

Cancellation windows associated with each ULCI monitoring occasion 435 may indicate time intervals in which resources may be canceled/revoked via ULCI messages 440 received in each respective ULCI monitoring occasion 435. For example, as shown in FIG. 2, the ULCI message 440 received in the second ULCI monitoring occasion 435-b may be configured to cancel resources (e.g., first resource 445) within the second cancelation window $T_{2CI}$.

In some aspects, the use of ULCI messages 440 may be used to cancel/revoke resources which were previously allocated for PUSCH transmissions 455, reference signals (e.g., SRSs, DMRSs 460), and the like. In some implementations, the UE 115-a may be unable to resume transmissions following a set of canceled resources, effectively causing a cancellation of additional resources. For example, in some cases where the ULCI message 440 cancels the first resource 445, the UE 115-a may be unable to resume transmissions following the first resource 445. In this regard, the cancelation of the first resource 445 may effectively cause a cancelation of the subset of resources 450 following the first resource 445. In some cases, cancellation of resources (e.g., first resource 445) without resume may be supported for PUSCH transmissions 455.

As noted previously herein, the cancelation of the first resource via the ULCI message 440 may impact an ability of the UE 115-a to maintain phase continuity for DMRSs 460 which are bundled across multiple TTIs (e.g., bundled across multiple slots), bundled across multiple PUSCH transmissions, or both. The specific impact of the cancelation on the ability of the UE 115-a to maintain phase continuity across bundled DMRSs 460 may be based on how the ULCI message 440 cancels the first resource 445, what the symbols included within the first resource 445 were allocated for (e.g., symbols for PUSCH transmissions 455, symbols for DMRSs 460), or both. For instance, the behavior of the UE 115-a with respect to maintaining (or not maintaining) phase coherency across bundled DMRSs 460 may be based on whether the first resource 445 canceled by the ULCI message 440 does not include any symbols allocated for DMRSs 460, includes some symbols allocated for DMRSs 460 within a slot, includes all symbols allocated for DMRSs 460 within a slot, or any combination thereof.

As such, the UE 115-a may be configured to maintain (or not maintain) phase continuity for bundled DMRSs 460 cancelation in accordance with one or more phase-continuity conditions and based on the cancelation. For example, the UE 115-a, the base station 105-a, or both, may determine one or more phase-continuity conditions for the set of resources 430 allocated by the control signaling 425. In particular, the UE 115-a and/or the base station 105-a may determine one or more phase-continuity conditions for the portion of the set of resources 430 which was allocated by the control signaling 425 and not canceled via the ULCI message 440.

In this regard, the UE 115-a and/or the base station 105-a may determine one or more phase-continuity conditions for the set of resources 430 based on transmitting/receiving the capability indication 410, transmitting/receiving the RRC message 415, transmitting/receiving the control message 420, transmitting/receiving the control signaling 425, transmitting/receiving the ULCI message 440, or any combination thereof. For example, in some cases, the UE 115-a may determine that the UE 115-a is to implement the phase-continuity conditions which were indicated via the control message 420 (e.g., DCI message, MAC-CE message).

In additional or alternative cases, the UE 115-a may determine which phase-continuity conditions that are to be used based on determining a type of resources which were canceled by the ULCI message 440 (e.g., type of symbols within the first resource 445 canceled by the ULCI message 440). For instance, a first phase-continuity condition may be met in cases where the first resource 445 which was canceled by the ULCI message 440 does not include any symbols which were allocated for DMRSs 460, as illustrated in FIG. 5. Conversely, a second phase-continuity condition may be met in cases where the first resource 445 which was canceled by the ULCI message 440 includes all symbols which were allocated for DMRSs 460 within particular slot, as illustrated in FIG. 7. Comparatively, a third phase-continuity condition may be met in cases where the first resource 445 which was canceled by the ULCI message 440 includes a subset of symbols which were allocated for DMRSs 460 within particular slot, as illustrated in FIG. 6. Examples of phase-continuity conditions will be described in further detail with respect to FIGS. 5-7.

Subsequently, the UE 115-*a* may transmit (e.g., coherently transmit) at least a subset of the set of uplink shared channel transmissions (e.g., PUSCH transmissions 455) scheduled via the control signaling 425 in one or more remaining resources of the set of resources 430 allocated via the control signaling 425. In this regard, the UE 115-*a* may transmit the PUSCH transmissions 455 which were scheduled by the control signaling 425 and not canceled or revoked via the ULCI message 440. As such, the UE 115-*a* may transmit the PUSCH transmissions 455 based on transmitting the capability indication 410, receiving the RRC message 415, receiving the control message 420, receiving the control signaling 425, receiving the ULCI message 440, determining the phase-continuity conditions, or any combination thereof. For example, the UE 115-*a* may transmit the PUSCH transmissions 455 (e.g., at least a subset of the set of PUSCH transmissions 455) in accordance with the determined phase-continuity conditions. In some aspects, the UE 115-*a* may transmit the PUSCH transmissions 455 having a phase continuity across one or more slots.

Moreover, the UE 115-*a* may transmit at least a subset of the set of DMRSs 460 scheduled via the control signaling 425 in one or more remaining resources of the set of resources 430 allocated via the control signaling 425. In this regard, the UE 115-*a* may transmit the DMRSs 460 which were scheduled by the control signaling 425 and not canceled or revoked via the ULCI message 440. In this regard, the UE 115-*a* may transmit the DMRSs 460 based on transmitting the capability indication 410, receiving the RRC message 415, receiving the control message 420, receiving the control signaling 425, receiving the ULCI message 440, determining the phase-continuity conditions, transmitting the PUSCH transmissions 455, or any combination thereof. For example, the UE 115-*a* may transmit the DMRSs 460 (e.g., at least a subset of the set of DMRSs 460) in accordance with the determined phase-continuity conditions.

For instance, in some cases, the UE 115-*a* may determine that a first phase-continuity condition is met or satisfied, as illustrated in FIG. 5. In some cases, the UE 115-*a* may be configured to determine that the first phase-continuity condition is satisfied based on determining that the first resource 445 canceled/revoked by the ULCI message 440 does not include any symbols which were allocated for DMRSs 460. In such cases, the UE 115-*a* may be configured to transmit the DMRSs 460 across the set of slots with a common (e.g., same) phase coherence, in accordance with the first phase-continuity condition. The first phase-continuity condition will be described in further detail with respect to FIG. 5.

By way of another example, in other cases, the UE 115-*a* may determine the second phase-continuity condition is met or satisfied, as illustrated in FIG. 6. In some cases, the UE 115-*a* may be configured to determine the second phase-continuity condition is satisfied based on determining that the first resource 445 canceled/revoked by the ULCI message 440 includes one or more symbols were allocated for DMRSs 460 in a given slot. In such cases, the UE 115-*a* may be configured to transmit a first subset of DMRSs 460 with a first phase coherency, and a second subset of DMRSs with a second phase coherency that is different from the first phase coherency. For instance, the UE 115-*a* may be configured to transmit the first subset of DMRSs 460 with the first phase coherency within a first set of consecutive slots which are prior to a slot including the first resource 445, and may transmit the second subset of DMRSs 460 with the second phase coherency within a second set of consecutive slots which are subsequent to the slot including the first resource 445. The second phase-continuity condition will be described in further detail with respect to FIG. 6.

By way of another example, in other cases, the UE 115-*a* may determine that third phase-continuity condition is met or satisfied, as illustrated in FIG. 6. In some cases, the UE 115-*a* may be configured to determine that third phase-continuity condition is satisfied based on determining that the first resource 445 canceled/revoked by the ULCI message 440 includes one or more symbols were allocated for DMRSs 460 in a given slot. In such cases, the UE 115-*a* may be configured to maintain phase (or not maintain) phase continuity across bundled DMRSs 460 based on a comparison of a time duration (e.g., time duration 645 illustrated in FIG. 6) with a threshold time interval associated with the UE 115-*a*.

For instance, if a time duration between a beginning of the first resource 445 canceled by the ULCI message 440 and a next PUSCH transmission 455 satisfies the threshold time interval (e.g., $T_{Duration} \leq T_{Thresh}$), the UE 115-*a* may transmit the DMRSs 460 across the set of slots (e.g., across the set of PUSCH transmission 455) with a same phase coherence. In this regard, if the time duration satisfies the threshold time interval, the third phase-continuity condition may cause the UE 115-*a* to maintain phase coherence across DMRSs 460 which are transmitted before and after the first resource 445. Conversely, if a time duration between a beginning of the first resource 445 canceled by the ULCI message 440 and a next PUSCH transmission 455 fails to satisfy the threshold time interval (e.g., $T_{Duration} > T_{Thresh}$), the UE 115-*a* may transmit a first subset of DMRSs 460 prior to the first resource 445 and a second subset of DMRSs 460 subsequent to the first resource 445 with different phase coherencies. In this regard, if the time duration fails to satisfy the threshold time interval, the third phase-continuity condition may cause the UE 115-*a* not to maintain phase coherence across DMRSs 460 which are transmitted before and after the first resource 445. The third phase-continuity condition will be described in further detail with respect to FIG. 6.

By way of another example, in other cases, the UE 115-*a* may determine that the fourth phase-continuity condition is met or satisfied, as illustrated in FIG. 7. In some cases, the UE 115-*a* may be configured to determine that the fourth phase-continuity condition is satisfied based on determining that the first resource 445 canceled/revoked by the ULCI message 440 includes all symbols were allocated for DMRSs 460 in a given slot. In such cases, the UE 115-*a* may be configured to transmit a first subset of DMRSs 460 with a first phase coherency, and a second subset of DMRSs 460 with a second phase coherency that is different from the first phase coherency, in accordance with the fourth phase-continuity condition. For instance, the UE 115-*a* may be configured to transmit the first subset of DMRSs 460 with the first phase coherency within a first set of consecutive slots and/or for a first set of consecutive PUSCH transmissions 455 which are prior to a slot including the first resource 445, and may transmit the second subset of DMRSs 460 with the second phase coherency within a second set of consecutive slots and/or for a second set of consecutive PUSCH transmissions 455 which are subsequent to the slot including the first resource 445. The fourth phase-continuity condition will be described in further detail with respect to FIG. 7.

In some aspects, the base station 105-a may determine a channel estimate for a wireless communication link (e.g., communication link 405) between the UE 115-a and the base station 105-a. In some aspects, the base station 105-a may determine the channel estimate based on aggregating at least a subset of the received DMRSs 460. For example, the base station 105-a may perform one or more demodulation and/or combining procedures (e.g., soft combining) on the set of DMRSs 460, and may perform channel estimation based on the performance of the demodulation and/or combining procedures. In this regard, the base station 105-a may determine the channel estimate based on receiving the PUSCH transmissions 455 (e.g., PUSCH transmissions 455 having phase continuity), receiving the DMRSs 460 having phase coherence, or both.

In some aspects, the base station 105-a may demodulate (e.g., decode) the uplink shared channel transmissions (e.g., phase-coherent PUSCH transmissions 455) based on the determined channel estimate. The channel estimate based on the DMRSs 460 may enable the base station 105-a to more efficiently and accurately account for noise and demodulate the PUSCH transmissions 455, thereby improving the reliability of wireless communications between the UE 115-a and the base station 105-a.

Subsequently, the UE 115-a and the base station 105-a may perform wireless communications. In this regard, the UE 115-a may exchange uplink signals, downlink signals, or both, with the base station 105-a. In some aspects, the UE 115-a and the base station 105-a may communicate with one another based on determining the channel estimate, demodulating the PUSCH transmissions 455, or both.

Techniques described herein may enable the UE 115-a to maintain phase continuity across DMRSs 460 bundled across multiple slots and/or across multiple PUSCH transmissions 455. In particular, techniques described herein may enable the UE 115-a to maintain some level of phase continuity across DMRSs 460 bundled across multiple slots and/or PUSCH transmissions in the event a portion of a set of resources 430 allocated for the DMRSs 460 and/or other transmissions is revoked or canceled. As such, by enabling the UE 115-a to maintain phase continuity across DMRSs 460 bundled across multiple slots, techniques described herein may enable more widespread use of phase-coherent DMRSs 460, which may enable more accurate channel estimations at the base station 105-a, improve a reliability of wireless communications within the wireless communications system 400, and improve overall user experience.

FIG. 5 illustrates an example of a resource configuration 500 that supports techniques for cross-slot channel estimation in accordance with aspects of the present disclosure. In some examples, resource configuration 500 may implement, or be implemented by, aspects of wireless communications systems 100, resource configuration 200, resource configuration 300, wireless communications system 400, or any combination thereof.

In some aspects, the resource configuration 500 illustrates a first phase-continuity condition which may be configured at and/or used by a UE 115 to maintain (or not maintain) phase coherency across DMRSs 535 which are bundled across multiple slots 510 and/or multiple PUSCH transmissions 530. In particular, the first phase-continuity condition illustrated in FIG. 5 may be used to maintain some level of phase continuity across DMRSs 535 in the event resources allocated for PUSCH transmissions 530 are canceled or revoked, but no resources allocated for DMRSs 535 are canceled or revoked.

For example, as noted previously herein, a UE 115 may receive control signaling 515 (e.g., DCI message, RRC message) which indicates a set of resources 520 for communications at the UE 115. The set of resources 520 may include resources for transmitting a set of uplink transmissions (e.g., PUSCH transmissions 530) and a set of DMRSs 535 having phase continuity across a set of slots 510-b, 510-c, 510-d, 510-e, and 510-f In some aspects, the set of resources 520 may include resource for transmitting the set of PUSCH transmissions 530 having phase continuity across the respective slots 510. As shown in FIG. 5, the set of resources 520 may include resources for transmitting one or more PUSCH transmissions 530 and resources for transmitting one or more phase-coherent DMRSs 535 within each slot 510 associated with the set of resource 520.

In some aspects, the set of DMRSs 535 may be said to have phase continuity across the set of slots 510-b, 510-c, 510-d, 510-e, and 510-f Additionally, or alternatively, the set of DMRSs 535 may be said to have phase continuity across the set of PUSCH transmissions 530. For example, as shown in FIG. 5, a single slot 510-b may include multiple PUSCH transmissions 530 (e.g., multiple PUSCH transmissions having phase continuity). In this example, the DMRSs 535 may be said to be bundled for phase continuity across the multiple PUSCH transmissions 530 within the slot 510-b.

Subsequently, the UE 115 may receive a control message (e.g., ULCI 525) which indicates a cancellation of a first resource of the set of resources 520. For example, the ULCI 525 illustrated in FIG. 5 may cancel or revoke a first resource (e.g., canceled resources 540) of the set of resources 520 which were previously configured/allocated by the control signaling 515. In this example, the first resource (e.g., canceled resources 540) of the set of resources which was canceled/revoked by the ULCI 525 may include resources which were allocated for one or more PUSCH transmissions 530, but may not include any resources which were allocated for DMRSs 535. In other words, the canceled resources 540 may include one or more symbols which were allocated for PUSCH transmissions 530 (e.g., PUSCH data symbols), but may not include any symbols which were allocated for DMRSs 535 (e.g., DMRS symbols). In such case, the UE 115 may not expect for the ULCI 525 to cancel any symbols allocated to bundled DMRSs 535.

Upon receiving the ULCI 525 indicating the cancelation of the first resource (e.g., canceled resources 540), the UE 115 may be configured to determine one or more phase-continuity conditions for the non-canceled portion of the set of resources 520, and may transmit at least a subset of the scheduled PUSCH transmissions 530 and/or at least a subset of the DMRSs 535 based on (e.g., in accordance with) the determined phase-continuity conditions.

For example, upon receiving the ULCI 525, the UE 115 may be configured to determine that the first phase-continuity condition is to be applied for the non-canceled portion of the set of resources 520. The UE 115 may be configured to determine the first phase-continuity condition based on signaling received from the base station 105 (e.g., RRC signaling, DCI messages, MAC-CE messages). Additionally or alternatively, the UE 115 may be configured to determine the first phase-continuity condition based on determining that the first resource (e.g., canceled resources 540) canceled by the ULCI 525 does not include any resources which were allocated for DMRSs 535.

In some aspects, the first phase-continuity condition may cause the UE 115 to maintain phase continuity across the DMRSs 535 which are bundled across the slots 510-*b* through 510-*f* and/or bundled across the PUSCH transmissions 530 within the slots 510-*b* through 510-*f* In other words, the first phase-continuity condition may cause the UE 115 to maintain phase-continuity across the DMRSs 535 which are transmitted in slot 510-*d* including the first resource (e.g., canceled resources 540) which were canceled/revoked by the ULCI 525 as well as the DMRSs 535 which are transmitted in the other bundled slots 510 before and after the first resource.

For example, in accordance with the first phase-continuity condition, the UE 115 may transmit each of the DMRSs 535 illustrated in FIG. 5 with a same phase continuity across the slots 510-*b* through 510-*f* (e.g., across the PUSCH transmissions 530 within the slots 510-*b* through 510-*f*). In particular, the UE 115 may transmit each DMRS 535 of the DMRSs 535 illustrated in FIG. 5 with a same phase continuity (e.g., same phase coherency) across the slots 510-*b* through 510-*f* based on the first resource (e.g., canceled resources 540) which were canceled by the ULCI 525 not including any symbols which were allocated for the set of DMRSs 535.

FIG. 6 illustrates an example of a resource configuration 600 that supports techniques for cross-slot channel estimation in accordance with aspects of the present disclosure. In some examples, resource configuration 600 may implement, or be implemented by, aspects of wireless communications systems 100, resource configuration 200, resource configuration 300, wireless communications system 400, or any combination thereof.

In some aspects, the resource configuration 600 illustrates one or more additional phase-continuity conditions which may be configured at and/or used by a UE 115. In particular, the phase-continuity conditions illustrated in FIG. 6 may be used to maintain some level of phase coherency across DMRSs 635 in the event resources allocated for PUSCH transmissions 630 and/or DMRSs 635 are canceled or revoked.

For example, as noted previously herein, a UE 115 may receive control signaling 615 (e.g., DCI message, RRC message) which indicates a set of resources 620 for communications at the UE 115. The set of resources 620 may include resources for transmitting a set of uplink transmissions (e.g., PUSCH transmissions 630) and a set of DMRSs 635 having phase continuity across a set of slots 610-*b*, 610-*c*, 610-*d*, 610-*e*, and 610-*f* In some aspects, the set of resources 620 may include resource for transmitting the set of PUSCH transmissions 630 having phase continuity across the respective slots 610. As shown in FIG. 6, the set of resources 620 may include resources for transmitting one or more PUSCH transmissions 630 and resources for transmitting one or more phase-coherent DMRSs 635 within each slot 610 associated with the set of resource 620.

In some aspects, the set of DMRSs 635 may be said to have phase continuity across the set of slots 610-*b*, 610-*c*, 610-*d*, 610-*e*, and 610-*f* Additionally, or alternatively, the set of DMRSs 635 may be said to have phase continuity across the set of PUSCH transmissions 630. For example, as shown in FIG. 6, a single slot 610-*b* may include multiple PUSCH transmissions 630 (e.g., multiple PUSCH transmissions having phase continuity). In this example, the DMRSs 635 may be said to be bundled for phase continuity across the multiple PUSCH transmissions 630 within the slot 610-*b*.

Subsequently, the UE 115 may receive a control message (e.g., ULCI 625) which indicates a cancellation of a first resource of the set of resources 620. For example, the ULCI 625 illustrated in FIG. 6 may cancel or revoke a first resource (e.g., canceled resources 640) of the set of resources 620 which were previously configured/allocated by the control signaling 615. In this example, the first resource (e.g., canceled resources 640) of the set of resources which was canceled/revoked by the ULCI 625 may include resources which were allocated for one or more PUSCH transmissions 630 as well as resources which were allocated for DMRSs 635. In other words, the canceled resources 640 may include one or more symbols which were allocated for PUSCH transmissions 630 (e.g., PUSCH data symbols), as well as one or more symbols which were allocated for DMRSs 635 (e.g., DMRS symbols).

Upon receiving the ULCI 625 indicating the cancelation of the first resource (e.g., canceled resources 640), the UE 115 may be configured to determine one or more phase-continuity conditions for the non-canceled portion of the set of resources 620, and may transmit at least a subset of the scheduled PUSCH transmissions 630 and/or at least a subset of the DMRSs 635 based on (e.g., in accordance with) the determined phase-continuity conditions.

For example, upon receiving the ULCI 625, the UE 115 may be configured to determine that it is to apply a second or third phase-continuity condition. The UE 115 may be configured to determine the second and/or third phase-continuity conditions based on signaling received from the base station 105 (e.g., RRC signaling, DCI messages, MAC-CE messages). Additionally or alternatively, the UE 115 may be configured to determine the second and/or third phase-continuity conditions based on determining that the first resource (e.g., canceled resources 640) canceled by the ULCI 625 includes one or more symbols of the set of resources 620 which were allocated for DMRSs 635.

In some cases, the second phase-continuity condition may cause the UE 115 to maintain phase continuity across DMRSs 635 which are scheduled in slots 610 which do not include any canceled resources (e.g., within slots 610 not including the canceled resources 640). In particular, the second phase-continuity condition may maintain phase continuity across DMRSs 635 within consecutive slots 610 which do not include any canceled resources. In other words, the second phase-continuity condition may cause a loss of phase continuity for DMRSs 635 transmitted within the slot 610-*d* associated with the canceled resources 640, but may maintain phase coherency across DMRSs 635 transmitted in the slots 610-*b* and 610-*c* prior to the canceled resources 640, and may maintain phase coherency across DMRSs 635 transmitted in the slots 610-*e* and 610-*f* after to the canceled resources 640.

For example, in accordance with the second phase-continuity condition, the UE 115 may transmit the DMRSs 635 within the slots 610-*b* and 610-*c* with a first phase coherency, and may transmit the DMRSs 635 within the slots 610-*e* and 610-*f* with a second phase coherency that is different from the first phase coherency. In this example, the DMRSs 635 transmitted in the slot 610-*d* associated with the canceled resources 640 may be transmitted without any phase coherency, with a third phase coherency that is different from the first and second phase coherencies, or both. Additionally or alternatively, the DMRSs 635 transmitted in the slot 610-*d* may be transmitted with one of the first or second phase coherency.

In additional or alternative aspects, the UE 115 may determine that the PUSCH transmissions 630 and/or DMRSs 635 within the non-canceled portion of the set of resources 620 are to be transmitted in accordance with a third phase-continuity condition. In some aspects, the third phase-continuity condition may cause the UE 115 to maintain (or not maintain) phase continuity for DMRSs 635 scheduled before and after the canceled resources 640 based on a time duration 645 associated with the canceled resources 640. Specifically, the third phase-continuity may maintain (or not maintain) phase continuity for DMRSs 635 scheduled before and after the canceled resources 640 based on a comparison of the time duration 645 to a threshold time interval ($T_{Thresh}$) associated with and/or configured at the UE 115.

In some aspects, the time duration 645 may define a duration of time between a beginning of the first resource canceled by the ULCI 625 (e.g., beginning of canceled resources 640) and a next PUSCH transmission 630 and/or DMRS 635 scheduled by the control signaling 615. For example, as shown in FIG. 6, the time duration 645 may be measured from a start of the canceled resources 640 to the next PUSCH transmission 630 scheduled in the slot 610-e. In some aspects, the threshold time interval ($T_{Thresh}$) against which the time duration 645 is to be compared may include a quantity of symbol periods (e.g., quantity of symbols). For example, the threshold time interval may include two symbols. In some aspects, the threshold time interval may be associated with a processing capability of the UE 115, which may be indicated to the base station 105 via UE capability signaling. Additionally or alternatively, the threshold time interval may be configured (e.g., pre-configured) at the UE 115, indicated to the UE 115 via signaling from the network, selectively adjusted by the UE 115 based on network conditions (e.g., signaling overhead, traffic), or any combination thereof.

In some aspects, the threshold time interval may indicate a duration of time (e.g., maximum duration of time) across which the UE 115 is capable or configured to maintain phase continuity for DMRSs 635. In particular, the threshold time interval may indicate a duration of time across which the UE 115 is capable of maintaining phase continuity for DMRSs 635 in the absence of other transmissions performed by the UE 115. If the UE 115 is not scheduled to perform transmissions (e.g., PUSCH transmissions 630) for a time duration 645 which is longer than the threshold time interval, it may be unable to maintain phase continuity for DMRSs 635 which are transmitted before and after the time duration 645. Comparatively, if the UE 115 is not scheduled to perform transmissions (e.g., PUSCH transmissions 630) for a time duration 645 which is less than or equal to the threshold time interval, it may be capable of maintaining phase continuity for DMRSs 635 which are transmitted before and after the time duration 645.

In this regard, in accordance with the third phase-continuity condition, the UE 115 may be configured to maintain (or not maintain) phase continuity for DMRSs 635 transmitted before and after the canceled resources 640 based on a comparison of the time duration 645 and the threshold time interval associated with the UE 115.

For example, in some cases, the UE 115 may determine that the time duration 645 satisfies the threshold time interval. In some implementations, the time duration 645 ($T_{Duration}$) may satisfy the threshold time interval ($T_{Thresh}$) in cases where the time duration 645 is less than or equal to the threshold time interval (e.g., threshold satisfied if $T_{Duration} \leq T_{Thresh}$). In this example, and in accordance with the third phase-continuity condition, the UE 115 may transmit the DMRSs 635 across all the slots 610-a through 610-f (e.g., across all PUSCH transmissions 630 within the slots 610-a through 610-f) with a same phase continuity based on the time duration 645 satisfying the threshold time interval.

In alternative cases, the UE 115 may determine that the time duration 645 fails to satisfy the threshold time interval. In some implementations, the time duration 645 ($T_{Duration}$) may fail to satisfy the threshold time interval ($T_{Thresh}$) in cases where the time duration 645 is greater than the threshold time interval (e.g., threshold not satisfied if $T_{Duration} > T_{Thresh}$). In this example, and in accordance with the third phase-continuity condition, the UE 115 may transmit a first subset of DMRSs 635 with a first phase coherence, and may transmit a second subset of DMRSs 635 with a second phase coherence which is different from the first phase coherence. For instance, the UE 115 may transmit a first subset of DMRSs 635 in the slots 610-b and 610-c (and/or with the PUSCH transmissions 630) prior to the canceled resources 640 with a first phase coherence, and may transmit a second subset of DMRSs 635 in the slots 610-e and 610-f (and/or with the PUSCH transmissions 630) subsequent to the canceled resources 640 with a second phase coherence which is different from the first phase coherence. In this example, the DMRSs 635 transmitted in the slot 610-d associated with the canceled resources 640 may be transmitted without any phase coherency, with a third phase coherency that is different from the first and second phase coherencies, or both. Additionally or alternatively, the DMRSs 635 transmitted in the slot 610-d may be transmitted with one of the first or second phase coherence.

FIG. 7 illustrates an example of a resource configuration 700 that supports techniques for cross-slot channel estimation in accordance with aspects of the present disclosure. In some examples, resource configuration 600 may implement, or be implemented by, aspects of wireless communications systems 100, resource configuration 200, resource configuration 300, wireless communications system 400, or any combination thereof.

In some aspects, the resource configuration 700 illustrates a fourth phase-continuity condition which may be configured at and/or used by a UE 115. In particular, the fourth phase-continuity condition illustrated in FIG. 7 may be used to maintain some level of phase coherency across DMRSs 735 in the event resources allocated for PUSCH transmissions 730 and/or DMRSs 735 are canceled or revoked.

For example, as noted previously herein, a UE 115 may receive control signaling 715 (e.g., DCI message, RRC message) which indicates a set of resources 720 for communications at the UE 115. The set of resources 720 may include resources for transmitting a set of uplink transmissions (e.g., PUSCH transmissions 730) and a set of DMRSs 735 having phase continuity across a set of slots 710-b, 710-c, 710-d, 710-e, and 710-f and/or the set of PUSCH transmissions 730. In some aspects, the set of resources 720 may include resource for transmitting the set of PUSCH transmissions 730 having phase continuity across the respective slots 710. As shown in FIG. 7, the set of resources 720 may include resources for transmitting one or more PUSCH transmissions 730 and resources for transmitting one or more phase-coherent DMRSs 735 within each slot 710 associated with the set of resource 720.

In some aspects, the set of DMRSs 735 may be said to have phase continuity across the set of slots 710-b, 710-c, 710-d, 710-e, and 710-f Additionally, or alternatively, the set of DMRSs 735 may be said to have phase continuity across the set of PUSCH transmissions 730. For example, as shown in FIG. 7, a single slot 710-b may include multiple PUSCH transmissions 730 (e.g., multiple PUSCH transmissions 730 having phase continuity). In this example, the DMRSs 735 may be said to be bundled for phase continuity across the multiple PUSCH transmissions 730 within the slot 710-*b*.

Subsequently, the UE 115 may receive a control message (e.g., ULCI 725) which indicates a cancellation of a first resource of the set of resources 720. For example, the ULCI 725 illustrated in FIG. 7 may cancel or revoke a first resource (e.g., canceled resources 740) of the set of resources 720 which were previously configured/allocated by the control signaling 715. In this example, the first resource (e.g., canceled resources 740) of the set of resources which was canceled/revoked by the ULCI 725 may include resources which were allocated for one or more PUSCH transmissions 730 as well as resources which were allocated for DMRSs 735. In other words, the canceled resources 740 may include one or more symbols which were allocated for PUSCH transmissions 730 (e.g., PUSCH data symbols), as well as one or more symbols which were allocated for DMRSs 735 (e.g., DMRS symbols).

For example, as shown in FIG. 7, the first resource (e.g., canceled resources 740) which was canceled by the ULCI 725 may include every symbol which was allocated for DMRSs 735 within the slot 710-*d*, every symbol which was allocated for PUSCH transmissions 730 within the slot 710-*d*, or both.

Upon receiving the ULCI 725 indicating the cancelation of the first resource (e.g., canceled resources 740), the UE 115 may be configured to determine one or more phase-continuity conditions for the non-canceled portion of the set of resources 720, and may transmit at least a subset of the scheduled PUSCH transmissions 730 and/or at least a subset of the DMRSs 735 based on (e.g., in accordance with) the determined phase-continuity conditions.

For example, upon receiving the ULCI 725, the UE 115 may be configured to determine that it is to apply the fourth phase-continuity condition. The UE 115 may be configured to determine the fourth phase-continuity condition based on signaling received from the base station 105 (e.g., RRC signaling, DCI messages, MAC-CE messages). Additionally or alternatively, the UE 115 may be configured to determine the fourth phase-continuity condition based on determining that the first resource (e.g., canceled resources 740) canceled by the ULCI 725 includes every symbol allocated for DMRSs 735 within the slot 710-*d*.

In some cases, the fourth phase-continuity condition may cause the UE 115 to maintain phase coherency across DMRSs 735 within consecutive slots 710 which do not include canceled resources which were allocated for DMRSs 735. In other words, the fourth phase-continuity condition may cause the UE 115 to maintain phase continuity across DMRSs 735 transmitted in the slots 710-*b* and 710-*c* prior to slot 710-*d* including the canceled resources 740, and to maintain phase coherency across DMRSs 735 transmitted in the slots 710-*e* and 710-*f* subsequent to slot 710-*d* including the canceled resources 740.

For example, the UE 115 may receive the ULCI 725 and determine that the ULCI 725 cancels all symbols which were allocated for DMRSs 735 within the slot 610-*d*. In this example, and in accordance with the fourth phase-continuity condition, UE 115 may transmit a first subset of DMRSs 735 with a first phase coherence, and may transmit a second subset of DMRSs 735 with a second phase coherence which is different from the first phase coherence. For instance, the UE 115 may transmit a first subset of DMRSs 735 in the slots 710-*b* and 710-*c* prior to the canceled resources 740 with a first phase coherence, and may transmit a second subset of DMRSs 735 in the slots 710-*e* and 710-*f* subsequent to the canceled resources 740 with a second phase coherence which is different from the first phase coherence. In other words, the fourth phase-continuity condition may cause the UE 115 to maintain phase continuity across slots 710 prior to the canceled resources 740 and across slots 710 subsequent to the canceled resources 740, but not across slots which are prior to and subsequent to the canceled resources 740.

Figure 8:
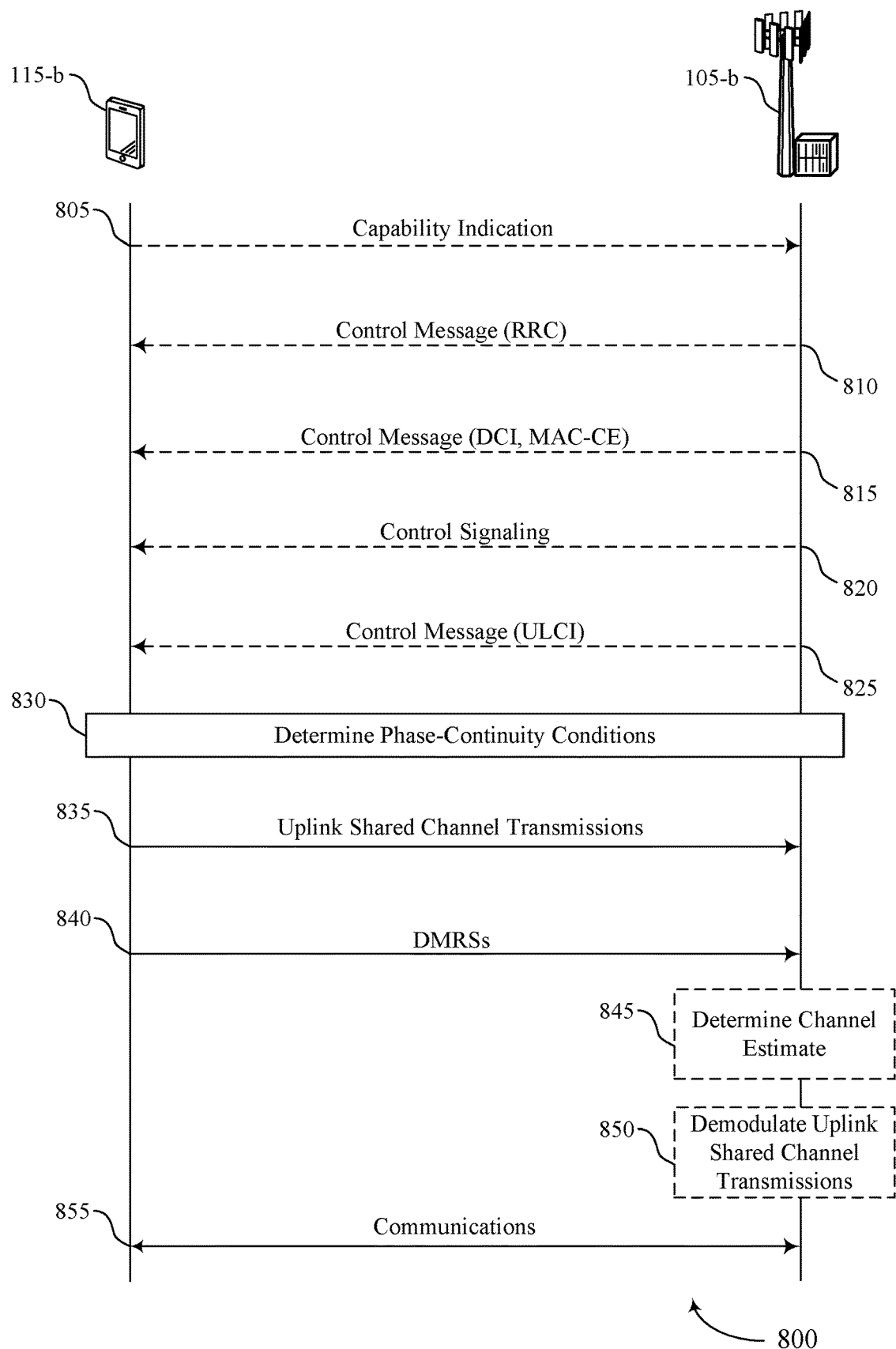
FIG. 8 illustrates an example of a process flow that supports techniques for cross-slot channel estimation in accordance with aspects of the present disclosure.

FIG. 8 illustrates an example of a process flow 800 that supports techniques for cross-slot channel estimation in accordance with aspects of the present disclosure. In some examples, process flow 800 may implement, or be implemented by, aspects of wireless communications systems 100, resource configuration 200, resource configuration 300, wireless communications system 400, resource configurations 500-700, or any combination thereof. For example, the process flow 800 may illustrate a UE 115-*b* receiving control signaling allocating a set of resources for uplink shared channel transmissions and phase-coherent DMRSs across a set of symbols, receiving a control message indicating a cancelation of a first resource of the set of resources, and transmitting at least subsets of the uplink shared channel transmissions and phase-coherent DMRSs in accordance with one or more phase-continuity conditions, as described with reference to FIGS. 1-7.

In some cases, process flow 800 may include a UE 115-*b* and a base station 105-*b*, which may be examples of corresponding devices as described herein. For example, the UE 115-*b* and the base station 105-*b* illustrated in FIG. 8 may be examples of UE 115-*a* and the base station 105-*a* illustrated in FIG. 2.

In some examples, the operations illustrated in process flow 800 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 805, the UE 115-*b* may transmit a capability indication (e.g., UE capability report) to the base station 105-*b*. The UE 115-*b* may transmit the capability indication as part of a random access procedure or attachment procedure which is performed with the base station 105-*b*. In some aspects, the capability indication may indicate one or more phase-continuity conditions which are supported by the UE 115-*b*.

For example, the capability indication may indicate whether or not the UE 115 supports the phase-continuity conditions illustrated in FIGS. 5, 6, 7, or any combination thereof. In some aspects, each phase-continuity conditions may define sets of rules or conditions which define whether phase-continuity is maintained (or not maintained) across DMRSs bundled across multiple slots and/or bundled across multiple PUSCH transmissions. More specifically, each phase-continuity conditions may define sets of rules or conditions which define whether phase-continuity is maintained (or not maintained) across DMRSs bundled across multiple slots and/or PUSCH transmissions in the event resources allocated for the DMRS or PUSCH transmissions are canceled or revoked.

The capability indication may include additional or alternative information associated with capabilities of the UE 115-*b*, phase-continuity conditions supported by the UE 115-*b*, or any combination thereof. For example, as noted previously herein, the phase-continuity conditions illustrated in FIG. 6 may be based on a comparison of a time duration 645 associated with canceled resources 640 which were canceled by the ULCI 625 with a threshold time interval. In such cases, the capability indication may indicate the threshold time interval associated with the third phase-continuity condition.

At 810, the UE 115-*b* may receive, from the base station 105-*b*, a control message indicating one or more phase-continuity conditions. In this regard, the control message may configure the UE 115-*b* with one or more phase-continuity conditions which may be used by the UE 115-*b*. In some cases the control message may include an RRC message. In some aspects, the base station 105-*b* may transmit the control message indicating the one or more phase-continuity conditions based on (e.g., in response to) receiving the capability indication at 805.

In some cases, the control message may instruct the UE 115-*b* as to which phase-continuity condition is to be used (e.g., static indication). In additional or alternative cases, the control message may simply configure the UE 115-*b* with a set of one or more phase-continuity conditions which may be used. In such cases, subsequent control signaling (e.g., control message at 815) may be used to indicate which phase-continuity conditions of the set of pre-configured phase-continuity conditions are to be used (e.g., dynamic indication). In some aspects, the control message may indicate one or more parameters associated with one or more phase-continuity conditions, including, but not limited to, a threshold time interval.

At 815, the UE 115-*b* may receive a control message indicating a phase-continuity condition of the set of pre-configured phase-continuity conditions that is to be used. For example, the control message at 815 may include a DCI message and/or a MAC-CE message which indicates one of the phase-continuity conditions which was configured at the UE 115-*b* via the control message (e.g., RRC message) at 810. In this regard, the UE 115-*b* may receive the control message at 815 based on transmitting the capability indication at 805, receiving the control message at 810, or both. In some aspects, the control message received at 815 may indicate one or more parameters associated with one or more phase-continuity conditions, including, but not limited to, a threshold time interval.

At 820, the UE 115-*b* may receive control signaling from the base station 105-*b*. The UE 115-*b* may receive the control signaling at 820 based on transmitting the capability indication at 805, receiving the control message at 810, receiving the control message at 815, or any combination thereof. In some aspects, the control signaling may indicate a set of resources usable by the UE 115-*b* for transmitting a set of uplink shared channel transmissions (e.g., PUSCH transmissions) and a set of DMRSs having phase continuity (e.g., phase-coherent DMRSs) across a set of TTIs (e.g., slots), across a set of PUSCH transmissions, or both. As such, the control signaling may allocate a set of resources for transmitting PUSCH transmissions and DMRSs across multiple slots, where the DMRSs are bundled for phase continuity across the multiple slots and/or across multiple PUSCH transmissions.

In some aspects, the set of resources allocated by the control signaling at 820 may include subsets of resources for transmitting both uplink shared channel transmissions (e.g., PUSCH transmissions) and DMRSs within each slot of the set of slots. In this regard, the control signaling may schedule a set of PUSCH transmissions and a set of DMRSs having phase continuity across multiple slots. For example, the control signaling at 820 may allocate a set of resources for coherently transmitting a set of PUSCH transmissions and a set of DMRSs having phase continuity across a first slot and a second slot. In this example, each of the first and second slots may include subsets of resources allocated for PUSCH transmissions and phase-coherent DMRSs, such that one or more PUSCH transmissions and one or more phase-coherent DMRSs may be transmitted in each of the first and second slots. In some aspects, the control signaling may schedule the PUSCH transmissions such that the PUSCH transmissions are to be transmitted across the multiple slots with phase continuity.

In some aspects, the set of resources allocated by the control signaling may include resources for multiple repetitions of the same uplink shared channel transmission (e.g., multiple PUSCH repetitions), different uplink shared channel transmissions (e.g., different PUSCH transmissions), or both. For instance, a first PUSCH transmission scheduled in a first slot may be scheduled by a first DCI message, and a second PUSCH transmission scheduled in a second slot may be scheduled by a second DCI message. In some aspects, different PUSCH transmissions may be scheduled via different scheduling grants (e.g., different DCI messages). For instance, a first PUSCH transmission may be scheduled via a first DCI message, and a second PUSCH transmission may be scheduled via a second DCI message which is different from the first DCI message.

At 825, the UE 115-*b* may receive, from the base station 105-*b*, a control message indicating a cancelation (e.g., revocation) of a first resource (e.g., subset of resources) of the set of resources which was allocated via the control signaling at 815. In some cases, the control message indicating the cancelation may include a ULCI message. The UE 115-*b* may receive the control message indicating the cancelation at 825 based on transmitting the capability indication at 805, receiving the control message at 810, receiving the control message at 815, receiving the control signaling allocating the set of resources at 820, or any combination thereof.

As noted previously herein, the cancelation of the first resource via the control message (e.g., ULCI message) at 825 may impact an ability of the UE 115-*b* to maintain phase continuity for DMRSs which are bundled across multiple TTIs (e.g., bundled across multiple slots), across multiple PUSCH transmissions, or both. The specific impact of the cancelation on the ability of the UE 115-*b* to maintain phase continuity across bundled DMRSs may be based on how the ULCI message cancels the first resource, what the symbols included within the first resource were allocated for (e.g., PUSCH transmissions, DMRSs), or both. For instance, the behavior of the UE 115-*b* with respect to maintaining (or not maintaining) phase continuity across bundled DMRSs may be based on whether the first resource canceled by the ULCI message does not include any symbols allocated for DMRSs, includes some symbols allocated for DMRSs within a slot, includes all symbols allocated for DMRSs within a slot, or any combination thereof.

As such, the UE 115-*b* may be configured to maintain (or not maintain) phase continuity for bundled DMRSs cancelation in accordance with one or more phase-continuity conditions and based on the cancelation. This may be described in further detail with respect to operation 820 of process flow 800.

At 830, the UE 115-*b*, the base station 105-*b*, or both, may determine one or more phase-continuity conditions for the set of resources allocated by the control signaling. In particular, the UE 115-*b* and/or the base station 105-*b* may determine one or more phase-continuity conditions for the portion of the set of resources which was allocated by the control signaling at 820 and not canceled via the control message at 815.

In this regard, the UE 115-*b* and/or the base station 105-*b* may determine the phase-continuity conditions for the set of resources at 830 based on transmitting/receiving the capability indication at 805, transmitting/receiving the control message at 810, transmitting/receiving the control message at 815, transmitting/receiving the control signaling at 820, transmitting/receiving the control message (e.g., ULCI message) at 825, or any combination thereof. For example, in some cases, the UE 115-*b* may determine that the UE 115-*b* is to implement the phase-continuity conditions which were indicated via the control message (e.g., DCI message, MAC-CE message) at 815.

In additional or alternative cases, the UE 115-*b* may determine which phase-continuity conditions that are to be used based on determining a type of resources which were canceled by the ULCI message (e.g., type of symbols within the first resource canceled by the ULCI message). For instance, in cases where the first resource which was canceled by the ULCI message does not include any symbols which were allocated for DMRSs, the UE 115-*b* may determine that it is to apply the first phase-continuity condition, as illustrated in FIG. 5. Conversely, in cases where the first resource which was canceled by the ULCI message includes all symbols which were allocated for DMRSs within particular slot, the UE 115-*b* may determine that it is to apply the fourth phase-continuity condition, as illustrated in FIG. 7. Comparatively, in cases where the first resource which was canceled by the ULCI message includes a subset of symbols which were allocated for DMRSs within particular slot, the UE 115-*b* may determine that it is to apply the second or third phase-continuity conditions, as illustrated in FIG. 6.

At 835, the UE 115-*b* may transmit (e.g., coherently transmit) at least a subset of the set of uplink shared channel transmissions (e.g., PUSCH transmissions) scheduled via the control signaling in one or more remaining resources of the set of resources allocated via the control signaling. In this regard, the UE 115-*b* may transmit the PUSCH transmissions which were scheduled by the control signaling at 820 and not canceled or revoked via the control message (e.g., ULCI message) at 825. In this regard, the UE 115-*b* may transmit the uplink shared channel transmissions at 835 based on transmitting the capability indication at 805, receiving the control message at 810, receiving the control message at 815, receiving the control signaling at 820, receiving the control message (e.g., ULCI message) at 825, determining the phase-continuity conditions at 830, or any combination thereof. For example, the UE 115-*b* may transmit the PUSCH transmissions (e.g., at least a subset of the set of PUSCH transmissions) at 835 in accordance with the phase-continuity conditions determined at 830. In some aspects, the UE 115-*b* may transmit at least a subset of the PUSCH transmissions with phase continuity across the set of slots.

At 840, the UE 115-*b* may transmit at least a subset of the set of DMRSs scheduled via the control signaling in one or more remaining resources of the set of resources allocated via the control signaling. In this regard, the UE 115-*b* may transmit the DMRSs which were scheduled by the control signaling at 820 and not canceled or revoked via the control message (e.g., ULCI message) at 825. In this regard, the UE 115-*b* may transmit the DMRSs at 835 based on transmitting the capability indication at 805, receiving the control message at 810, receiving the control message at 815, receiving the control signaling at 820, receiving the control message (e.g., ULCI message) at 825, determining the phase-continuity conditions at 830, transmitting the uplink shared channel transmissions at 835, or any combination thereof. For example, the UE 115-*b* may transmit the DMRSs (e.g., at least a subset of the set of DMRSs) at 835 in accordance with the phase-continuity conditions determined at 830.

For instance, in some cases, the UE 115-*b* may determine that it is to apply the first phase-continuity condition (as illustrated in FIG. 5). In some cases, the UE 115-*b* may be configured to determine that it is to apply the first phase-continuity condition based on determining that the first resource canceled/revoked by the ULCI message does not include any symbols which were allocated for DMRSs. In such cases, the UE 115-*b* may be configured to transmit the DMRSs at 840 across the set of slots with a common (e.g., same) phase coherence, in accordance with the first phase-continuity condition.

By way of another example, in other cases, the UE 115-*b* may determine that it is to apply the second phase-continuity condition (as illustrated in FIG. 6). In some cases, the UE 115-*b* may be configured to determine that it is to apply the second phase-continuity condition based on determining that the first resource canceled/revoked by the ULCI message includes one or more symbols were allocated for DMRSs in a given slot. In such cases, the UE 115-*b* may be configured to transmit a first subset of DMRSs with a first phase coherency, and a second subset of DMRSs with a second phase coherency that is different from the first phase coherency. For instance, the UE 115-*b* may be configured to transmit the first subset of DMRSs with the first phase coherency within a first set of consecutive slots which are prior to a slot including the canceled resources, and may transmit the second subset of DMRSs with the second phase coherency within a second set of consecutive slots which are subsequent to the slot including the canceled resources.

By way of another example, in other cases, the UE 115-*b* may determine that it is to apply the third phase-continuity condition (as illustrated in FIG. 6). In some cases, the UE 115-*b* may be configured to determine that it is to apply the third phase-continuity condition based on determining that the first resource canceled/revoked by the ULCI message includes one or more symbols were allocated for DMRSs in a given slot. In such cases, the UE 115-*b* may be configured to maintain phase (or not maintain) phase continuity across bundled DMRSs based on a comparison of a time duration (e.g., time duration 645 illustrated in FIG. 6) with a threshold time interval associated with the UE 115-*b*.

For instance, if a time duration between a beginning of the first resource canceled by the ULCI message and a next PUSCH transmission satisfies the threshold time interval (e.g., $T_{Duration} \leq T_{Thresh}$), the UE 115-*b* may transmit the DMRSs across the set of slots with a same phase coherence (e.g., same phase continuity). In this regard, if the time duration satisfies the threshold time interval, the third phase-continuity condition may cause the UE 115-*b* to maintain phase coherence across DMRSs which are transmitted before and after the canceled resources. Conversely, if a time duration between a beginning of the first resource canceled by the ULCI message and a next PUSCH transmission fails to satisfy the threshold time interval (e.g., $T_{Duration} > T_{Thresh}$), the UE 115-*b* may transmit a first subset of DMRSs prior to the canceled resources and a second subset of DMRSs subsequent to the canceled resources with different phase coherencies. In this regard, if the time duration fails to satisfy the threshold time interval, the third phase-continuity condition may cause the UE 115-b not to maintain phase coherence across DMRSs which are transmitted before and after the canceled resources.

By way of another example, in other cases, the UE 115-b may determine that it is to apply the fourth phase-continuity condition (as illustrated in FIG. 7). In some cases, the UE 115-b may be configured to determine that it is to apply the fourth phase-continuity condition based on determining that the first resource canceled/revoked by the ULCI message includes all symbols were allocated for DMRSs in a given slot. In such cases, the UE 115-b may be configured to transmit a first subset of DMRSs with a first phase coherency, and a second subset of DMRSs with a second phase coherency that is different from the first phase coherency, in accordance with the fourth phase-continuity condition. For instance, the UE 115-b may be configured to transmit the first subset of DMRSs with the first phase coherency within a first set of consecutive slots which are prior to a slot including the canceled resources, and may transmit the second subset of DMRSs with the second phase coherency within a second set of consecutive slots which are subsequent to the slot including the canceled resources.

At 845, the base station 105-b may determine a channel estimate for a wireless communication link between the UE 115-b and the base station 105-b. In some aspects, the base station 105-b may determine the channel estimate based on aggregating at least a portion of the DMRSs received at 840. For example, the base station 105-b may perform one or more demodulation and/or combining procedures (e.g., soft combining) on the set of DMRSs at 840, and may perform channel estimation based on the performance of the demodulation and/or combining procedures. In this regard, the base station 105-b may determine the channel estimate based on receiving the uplink shared channel transmissions at 835 (e.g., PUSCH transmissions having phase continuity), receiving the DMRSs having phase coherence at 840, or both.

At 850, the base station 105-b may demodulate (e.g., decode) the uplink shared channel transmissions (e.g., PUSCH transmissions) received at 835. In some aspects, the base station 105-b may demodulate the uplink shared channel transmissions at 850 based on the channel estimate which was determined at 845. The channel estimate based on the DMRSs may enable the base station 105-b to more efficiently and accurately account for noise and demodulate the uplink shared channel transmissions, thereby improving the reliability of wireless communications between the UE 115-b and the base station 105-b.

At 855, the UE 115-b and the base station 105-b may perform wireless communications. In this regard, the UE 115-b may exchange uplink signals, downlink signals, or both, with the base station 105-b. In some aspects, the UE 115-b and the base station 105-b may communicate with one another at 855 based on determining the channel estimate at 845, demodulating the uplink shared channel transmissions at 850, or both.

Techniques described herein may enable UEs 115 to maintain phase continuity across DMRSs bundled across multiple slots and/or across multiple PUSCH transmissions. In particular, techniques described herein may enable the UE 115-b to maintain some level of phase continuity across DMRSs bundled across multiple slots and/or multiple PUSCH transmissions in the event a portion of resources allocated for the DMRSs and/or PUSCH transmissions is revoked or canceled. As such, by enabling the UE 115-b to maintain phase continuity across DMRSs bundled across multiple slots and/or multiple transmissions, techniques described herein may enable more widespread use of phase-coherent DMRSs, which may enable more accurate channel estimations at the base station 105-b, improve a reliability of wireless communications within the wireless communications system, and improve overall user experience.

Figure 9:
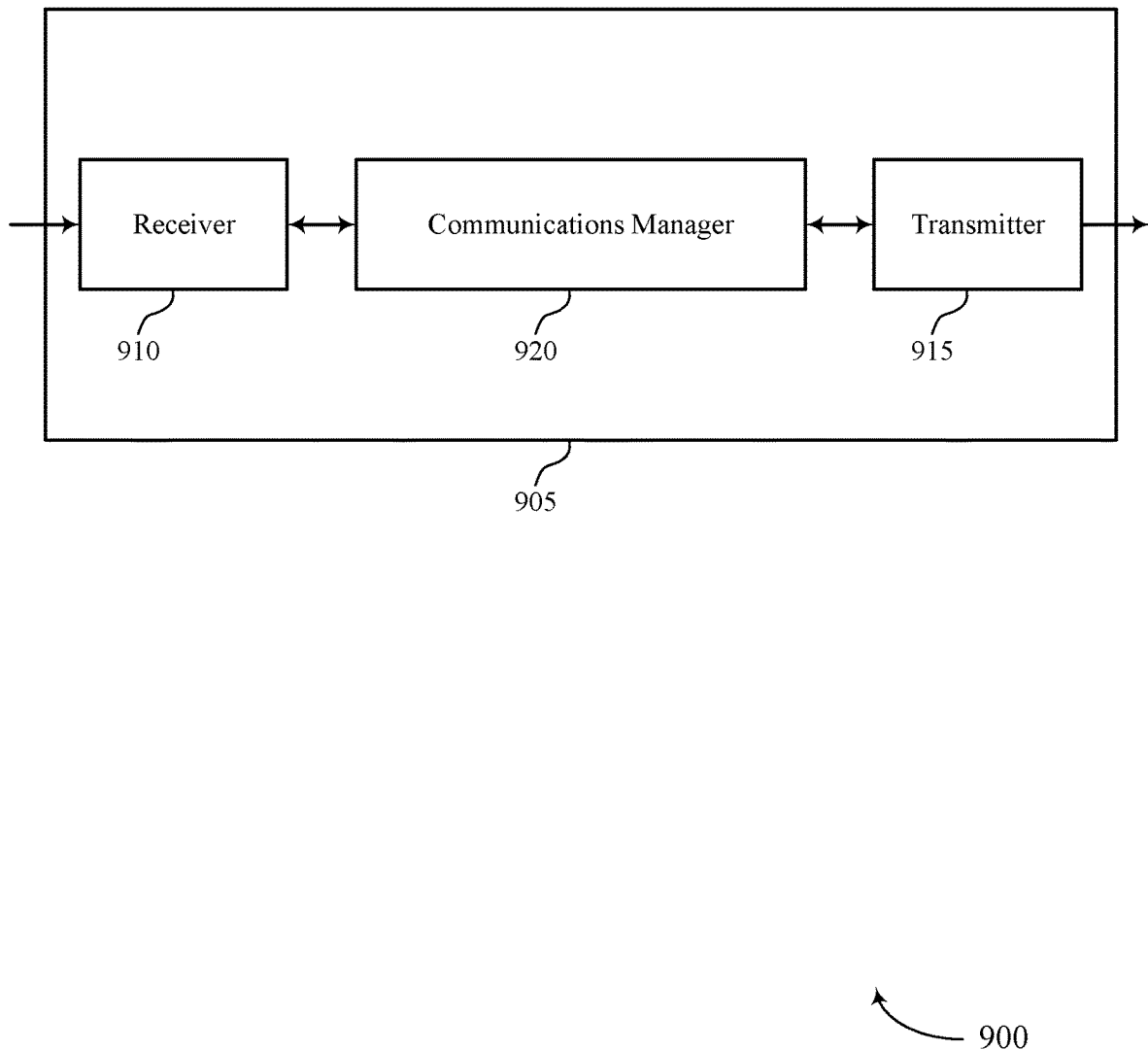
FIGS. 9 and 10 show block diagrams of devices that support techniques for cross-slot channel estimation in accordance with aspects of the present disclosure.

FIG. 9 shows a block diagram 900 of a device 905 that supports techniques for cross-slot channel estimation in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for cross-slot channel estimation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for cross-slot channel estimation). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for cross-slot channel estimation as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for maintaining phase coherency across DMRSs bundled across multiple slots. In particular, techniques described herein may enable UEs 115 to maintain some level of phase coherency across DMRSs bundled across multiple slots in the event a portion of resources allocated for the DMRSs and/or other transmissions is revoked or canceled. As such, by enabling UEs 115 to maintain phase coherency across DMRSs bundled across multiple slots, techniques described herein may enable more widespread use of phase-coherent DMRSs, which may enable more accurate channel estimations at the base station 105, improve a reliability of wireless communications within the wireless communications system, and improve overall user experience.

Figure 10:
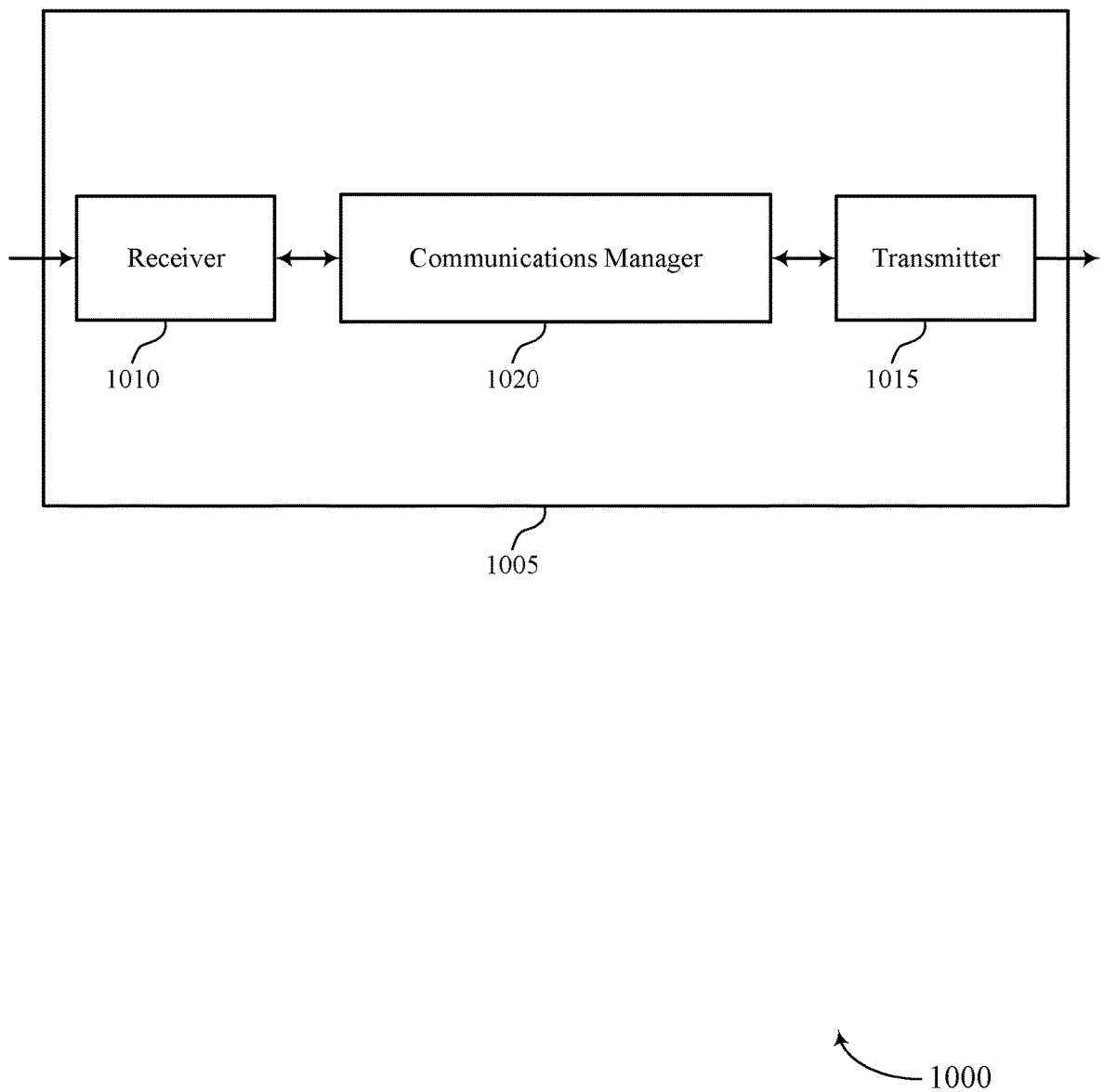

FIG. 10 shows a block diagram 1000 of a device 1005 that supports techniques for cross-slot channel estimation in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for cross-slot channel estimation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for cross-slot channel estimation). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for cross-slot channel estimation as described herein. For example, the communications manager 1020 may include, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

Figure 11:
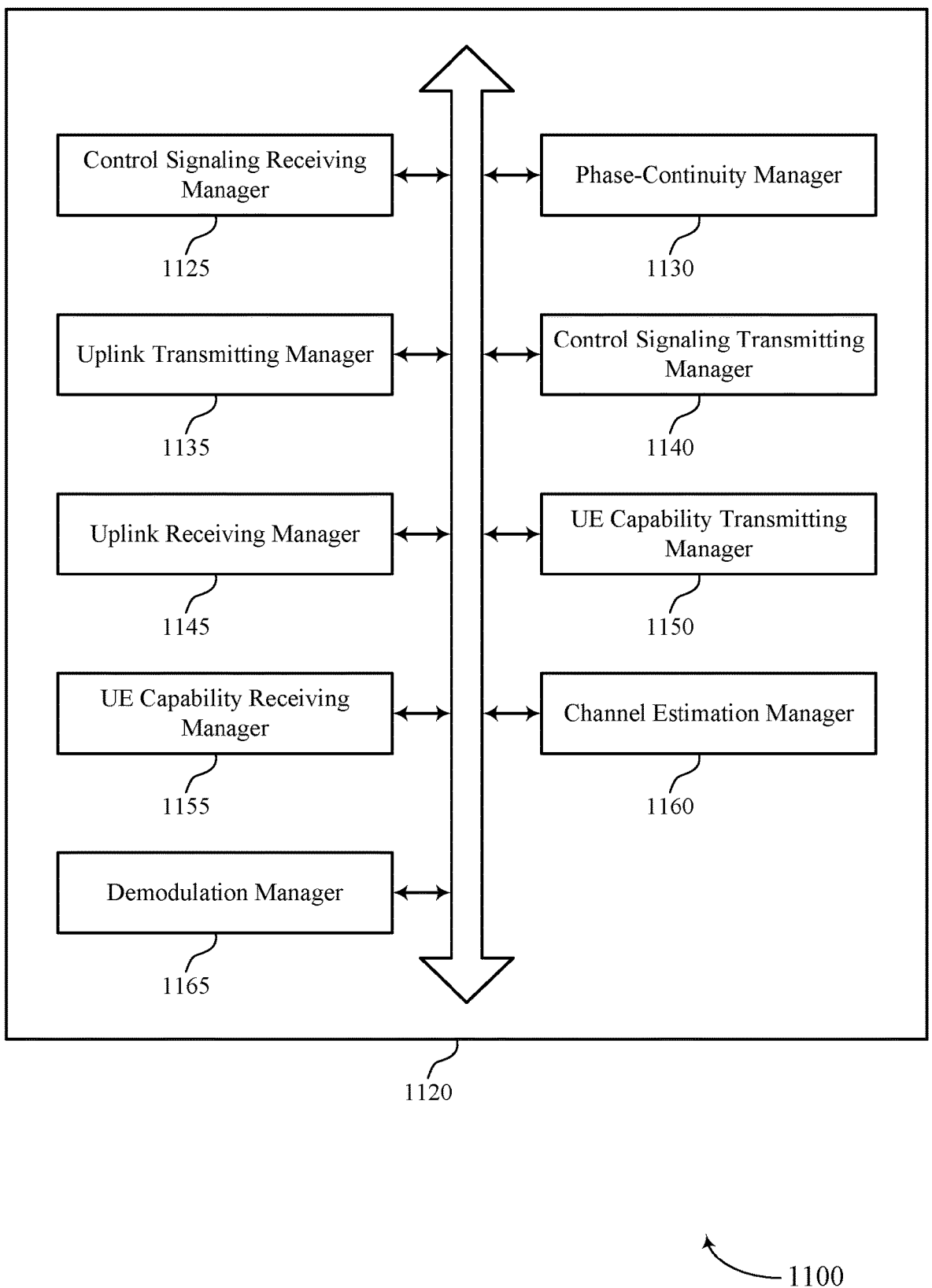
FIG. 11 shows a block diagram of a communications manager that supports techniques for cross-slot channel estimation in accordance with aspects of the present disclosure.

FIG. 11 shows a block diagram 1100 of a communications manager 1120 that supports techniques for cross-slot channel estimation in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for cross-slot channel estimation as described herein. For example, the communications manager 1120 may include, or any combination thereof. Each of these components may communicate, directly or indirectly, with one another (e.g., via one or more buses).

Figure 12:
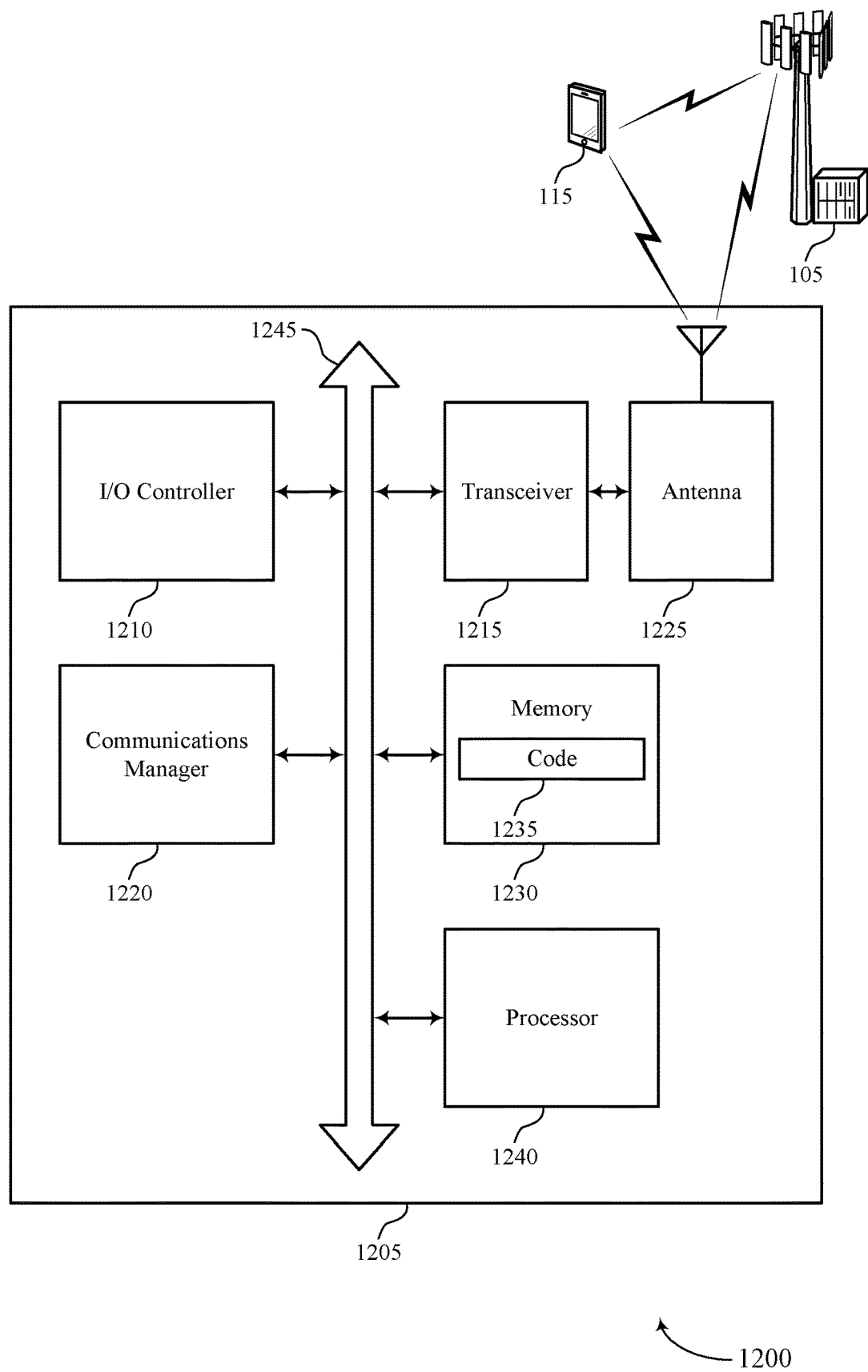
FIG. 12 shows a diagram of a system including a device that supports techniques for cross-slot channel estimation in accordance with aspects of the present disclosure.

FIG. 12 shows a diagram of a system 1200 including a device 1205 that supports techniques for cross-slot channel estimation in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for cross-slot channel estimation). For example, the device 1205 or a component of the device 1205 may include a processor 1240 and memory 1230 coupled to the processor 1240, the processor 1240 and memory 1230 configured to perform various functions described herein.

By including or configuring the communications manager 1220 in accordance with examples as described herein, the device 1205 may support techniques for maintaining phase coherency across DMRSs bundled across multiple slots. In particular, techniques described herein may enable UEs 115 to maintain some level of phase coherency across DMRSs bundled across multiple slots in the event a portion of resources allocated for the DMRSs and/or other transmissions is revoked or canceled. As such, by enabling UEs 115 to maintain phase coherency across DMRSs bundled across multiple slots, techniques described herein may enable more widespread use of phase-coherent DMRSs, which may enable more accurate channel estimations at the base station 105, improve a reliability of wireless communications within the wireless communications system, and improve overall user experience.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for cross-slot channel estimation as described herein, or the processor 1240 and the memory 1230 may be otherwise configured to perform or support such operations.

Figure 13:
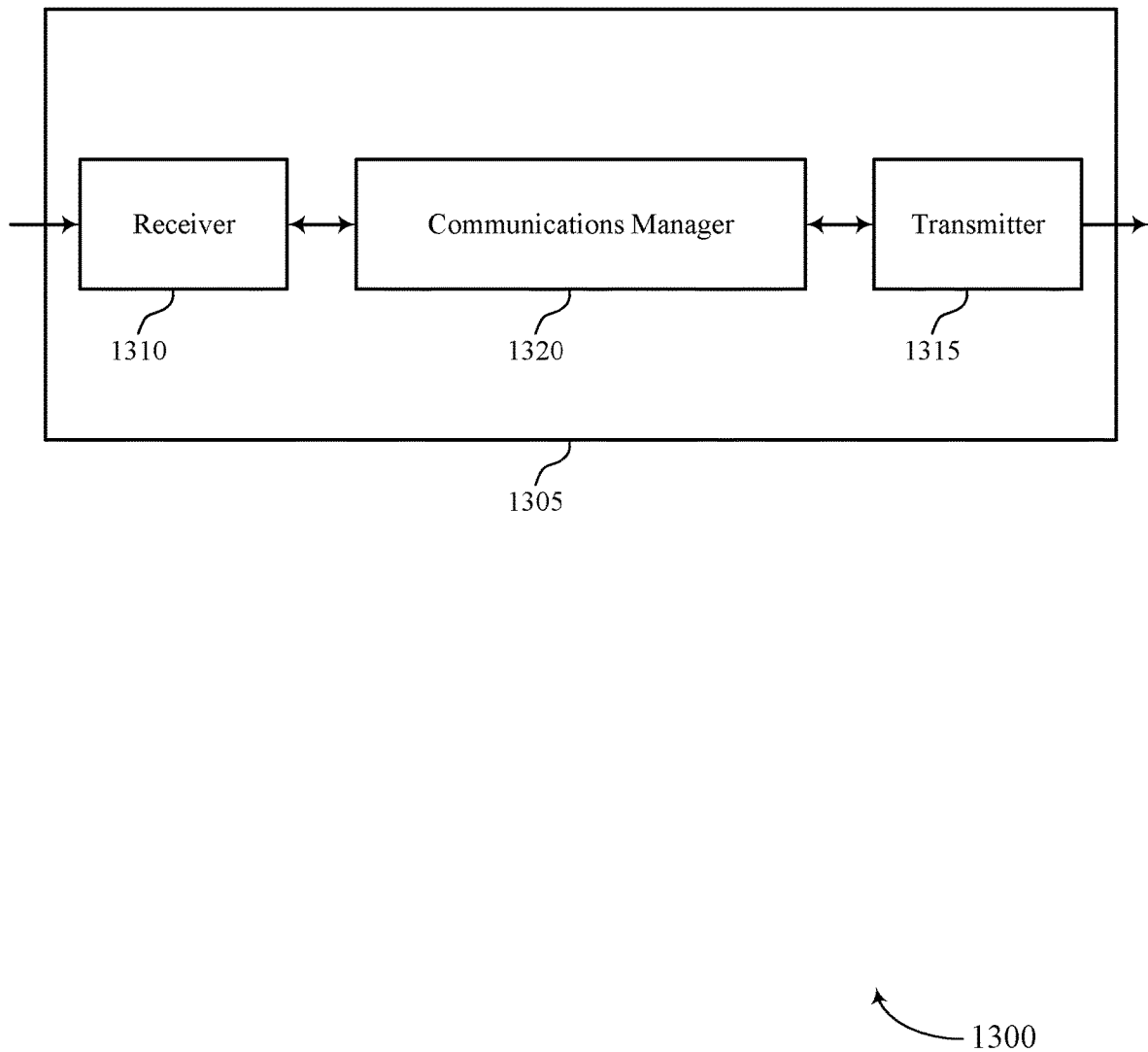
FIGS. 13 and 14 show block diagrams of devices that support techniques for cross-slot channel estimation in accordance with aspects of the present disclosure.

FIG. 13 shows a block diagram 1300 of a device 1305 that supports techniques for cross-slot channel estimation in accordance with aspects of the present disclosure. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for cross-slot channel estimation). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for cross-slot channel estimation). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of techniques for cross-slot channel estimation as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a UE in accordance with examples as disclosed herein. For example, the communications manager 1320 may be configured as or otherwise support a means for receiving, from a base station, control signaling indicating a set of multiple resources for transmitting a set of multiple uplink shared channel transmissions and a set of multiple DMRSs having phase continuity across a set of multiple TTIs. The communications manager 1320 may be configured as or otherwise support a means for receiving, from the base station, a control message indicating a cancellation of a first resource of the set of multiple resources. The communications manager 1320 may be configured as or otherwise support a means for determining one or more phase-continuity conditions for the set of multiple resources based on receiving the control message indicating the cancellation of the first resource. The communications manager 1320 may be configured as or otherwise support a means for transmitting, in one or more remaining resources of the set of multiple resources, at least a subset of the set of multiple uplink shared channel transmissions and at least a subset of the set of multiple DMRSs in accordance with the one or more phase-continuity conditions.

Additionally or alternatively, the communications manager 1320 may support wireless communication at a base station in accordance with examples as disclosed herein. For example, the communications manager 1320 may be configured as or otherwise support a means for transmitting, to a UE, control signaling indicating a set of multiple resources for transmitting a set of multiple uplink shared channel transmissions and a set of multiple DMRSs having phase continuity across a set of multiple TTIs. The communications manager 1320 may be configured as or otherwise support a means for transmitting, to the UE, a control message indicating a cancellation of a first resource of the set of multiple resources. The communications manager 1320 may be configured as or otherwise support a means for determining one or more phase-continuity conditions for the set of multiple resources based on transmitting the control message indicating the cancellation of the first resource. The communications manager 1320 may be configured as or otherwise support a means for receiving, in one or more remaining resources of the set of multiple resources, at least a subset of the set of multiple uplink shared channel transmissions and at least a subset of the set of multiple DMRSs in accordance with the one or more phase-continuity conditions.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for maintaining phase coherency across DMRSs bundled across multiple slots. In particular, techniques described herein may enable UEs 115 to maintain some level of phase coherency across DMRSs bundled across multiple slots in the event a portion of resources allocated for the DMRSs and/or other transmissions is revoked or canceled. As such, by enabling UEs 115 to maintain phase coherency across DMRSs bundled across multiple slots, techniques described herein may enable more widespread use of phase-coherent DMRSs, which may enable more accurate channel estimations at the base station 105, improve a reliability of wireless communications within the wireless communications system, and improve overall user experience.

Figure 14:
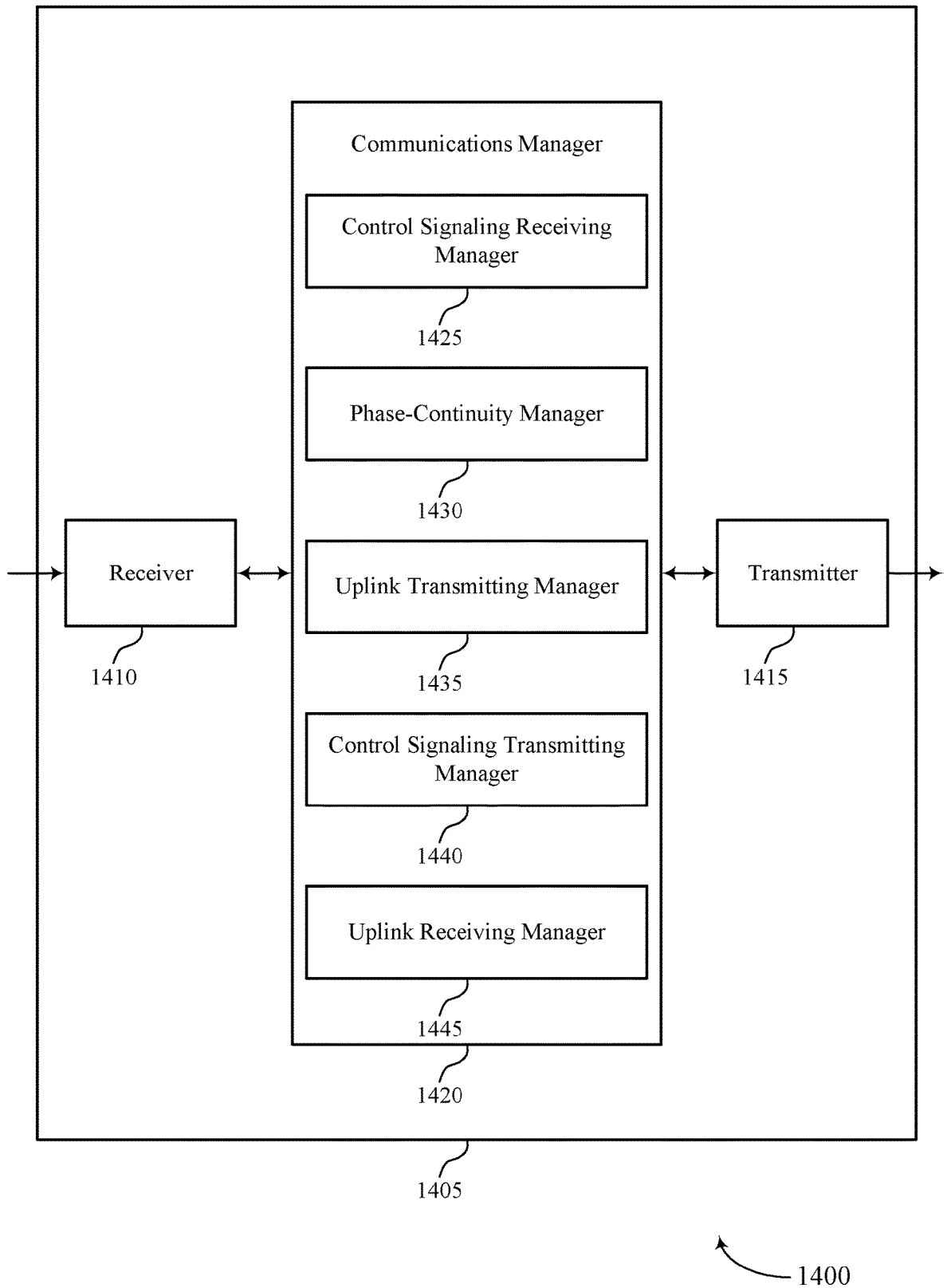

FIG. 14 shows a block diagram 1400 of a device 1405 that supports techniques for cross-slot channel estimation in accordance with aspects of the present disclosure. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to techniques for cross-slot channel estimation). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to techniques for cross-slot channel estimation). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of techniques for cross-slot channel estimation as described herein. For example, the communications manager 1420 may include a control signaling receiving manager 1425, a phase-continuity manager 1430, an uplink transmitting manager 1435, a control signaling transmitting manager 1440, an uplink receiving manager 1445, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a UE in accordance with examples as disclosed herein. The control signaling receiving manager 1425 may be configured as or otherwise support a means for receiving, from a base station, control signaling indicating a set of multiple resources for transmitting a set of multiple uplink shared channel transmissions and a set of multiple DMRSs having phase continuity across a set of multiple TTIs. The control signaling receiving manager 1425 may be configured as or otherwise support a means for receiving, from the base station, a control message indicating a cancellation of a first resource of the set of multiple resources. The phase-continuity manager 1430 may be configured as or otherwise support a means for determining one or more phase-continuity conditions for the set of multiple resources based on receiving the control message indicating the cancellation of the first resource. The uplink transmitting manager 1435 may be configured as or otherwise support a means for transmitting, in one or more remaining resources of the set of multiple resources, at least a subset of the set of multiple uplink shared channel transmissions and at least a subset of the set of multiple DMRSs in accordance with the one or more phase-continuity conditions.

Additionally or alternatively, the communications manager 1420 may support wireless communication at a base station in accordance with examples as disclosed herein. The control signaling transmitting manager 1440 may be configured as or otherwise support a means for transmitting, to a UE, control signaling indicating a set of multiple resources for transmitting a set of multiple uplink shared channel transmissions and a set of multiple DMRSs having phase continuity across a set of multiple TTIs. The control signaling transmitting manager 1440 may be configured as or otherwise support a means for transmitting, to the UE, a control message indicating a cancellation of a first resource of the set of multiple resources. The phase-continuity manager 1430 may be configured as or otherwise support a means for determining one or more phase-continuity conditions for the set of multiple resources based on transmitting the control message indicating the cancellation of the first resource. The uplink receiving manager 1445 may be configured as or otherwise support a means for receiving, in one or more remaining resources of the set of multiple resources, at least a subset of the set of multiple uplink shared channel transmissions and at least a subset of the set of multiple DMRSs in accordance with the one or more phase-continuity conditions.

Figure 15:
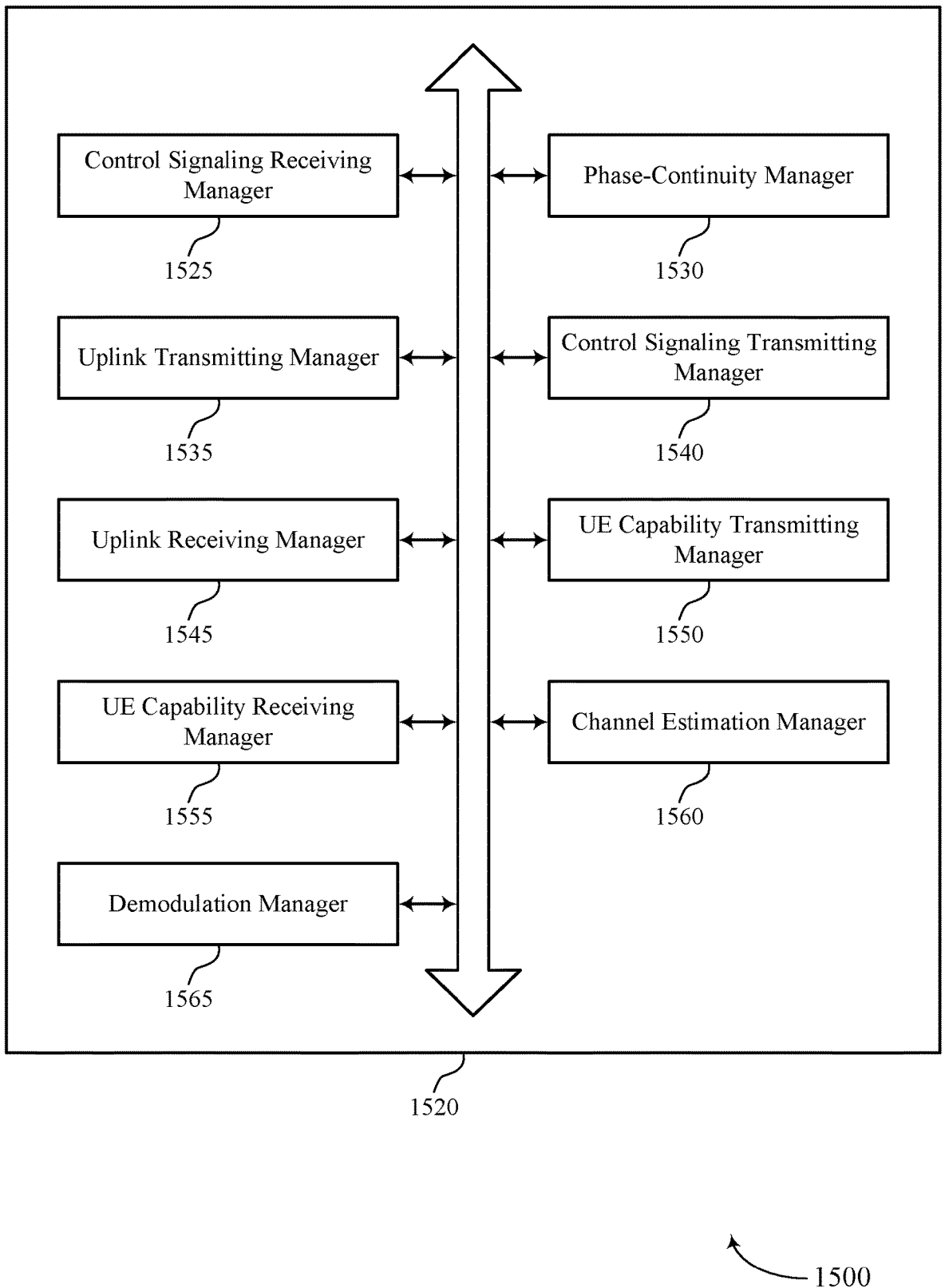
FIG. 15 shows a block diagram of a communications manager that supports techniques for cross-slot channel estimation in accordance with aspects of the present disclosure.

FIG. 15 shows a block diagram 1500 of a communications manager 1520 that supports techniques for cross-slot channel estimation in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of techniques for cross-slot channel estimation as described herein. For example, the communications manager 1520 may include a control signaling receiving manager 1525, a phase-continuity manager 1530, an uplink transmitting manager 1535, a control signaling transmitting manager 1540, an uplink receiving manager 1545, a UE capability transmitting manager 1550, a UE capability receiving manager 1555, a channel estimation manager 1560, a demodulation manager 1565, or any combination thereof. Each of these components may communicate, directly or indirectly, with one another (e.g., via one or more buses).

The communications manager 1520 may support wireless communication at a UE in accordance with examples as disclosed herein. The control signaling receiving manager 1525 may be configured as or otherwise support a means for receiving, from a base station, control signaling indicating a set of multiple resources for transmitting a set of multiple uplink shared channel transmissions and a set of multiple DMRSs having phase continuity across a set of multiple TTIs. In some examples, the control signaling receiving manager 1525 may be configured as or otherwise support a means for receiving, from the base station, a control message indicating a cancellation of a first resource of the set of multiple resources. The phase-continuity manager 1530 may be configured as or otherwise support a means for determining one or more phase-continuity conditions for the set of multiple resources based on receiving the control message indicating the cancellation of the first resource. The uplink transmitting manager 1535 may be configured as or otherwise support a means for transmitting, in one or more remaining resources of the set of multiple resources, at least a subset of the set of multiple uplink shared channel transmissions and at least a subset of the set of multiple DMRSs in accordance with the one or more phase-continuity conditions.

In some examples, the uplink transmitting manager 1535 may be configured as or otherwise support a means for transmitting the subset of the set of multiple DMRSs having phase continuity across the set of multiple TTIs based on a time duration between a beginning of the first resource and a next uplink shared channel transmission of the set of multiple uplink shared channel transmissions satisfying a threshold time interval. In some examples, the threshold time interval includes a quantity of symbol periods.

In some examples, to support transmitting, the uplink transmitting manager 1535 may be configured as or otherwise support a means for transmitting a first subset of the set of multiple DMRSs having a first phase coherency and a second subset of the set of multiple DMRSs having a second phase coherency based on a time duration between a beginning of the first resource and a next uplink shared channel transmission of the set of multiple uplink shared channel transmissions not satisfying a threshold time interval.

In some examples, the first subset of the set of multiple DMRSs are transmitted prior to the first resource. In some examples, the second subset of the set of multiple DMRSs are transmitted subsequent to the first resource.

In some examples, to support transmitting, the uplink transmitting manager 1535 may be configured as or otherwise support a means for transmitting a first subset of the set of multiple DMRSs having a first phase coherency and a second subset of the set of multiple DMRSs having a second phase coherency based on the first resource including one or more symbols allocated for one of the set of multiple DMRSs.

In some examples, the one or more symbols allocated for the set of multiple DMRSs include all symbols allocated for the set of multiple DMRSs within a TTI of the set of multiple TTIs.

In some examples, to support transmitting, the uplink transmitting manager 1535 may be configured as or otherwise support a means for transmitting the subset of the set of multiple DMRSs having phase coherency across the set of multiple TTIs based on the first resource not including any symbols allocated for the set of multiple DMRSs.

In some examples, the UE capability transmitting manager 1550 may be configured as or otherwise support a means for transmitting, to the base station, an indication of one or more phase-continuity conditions supported by the UE, where receiving the control message, determining the one or more phase-continuity conditions, or both, is based on transmitting the indication of one or more phase-continuity conditions supported by the UE.

In some examples, the set of multiple resources, for each TTI of the set of multiple TTIs, includes a first subset of resources allocated for the set of multiple uplink shared channel transmissions and second subset of resources allocated for the set of multiple DMRSs.

In some examples, the set of multiple uplink shared channel transmissions include a set of multiple repetitions of a same uplink shared channel transmission. In some examples, the set of multiple uplink shared channel transmissions include a first uplink shared channel transmission and a second uplink shared channel transmission different from the first uplink shared channel transmission. In some examples, the set of multiple TTIs includes a set of multiple slots. In some examples, the control message indicating the cancellation includes an ULCI message.

Additionally or alternatively, the communications manager 1520 may support wireless communication at a base station in accordance with examples as disclosed herein. The control signaling transmitting manager 1540 may be configured as or otherwise support a means for transmitting, to a UE, control signaling indicating a set of multiple resources for transmitting a set of multiple uplink shared channel transmissions and a set of multiple DMRSs having phase continuity across a set of multiple TTIs. In some examples, the control signaling transmitting manager 1540 may be configured as or otherwise support a means for transmitting, to the UE, a control message indicating a cancellation of a first resource of the set of multiple resources. In some examples, the phase-continuity manager 1530 may be configured as or otherwise support a means for determining one or more phase-continuity conditions for the set of multiple resources based on transmitting the control message indicating the cancellation of the first resource. The uplink receiving manager 1545 may be configured as or otherwise support a means for receiving, in one or more remaining resources of the set of multiple resources, at least a subset of the set of multiple uplink shared channel transmissions and at least a subset of the set of multiple DMRSs in accordance with the one or more phase-continuity conditions.

In some examples, the uplink receiving manager 1545 may be configured as or otherwise support a means for receiving the subset of the set of multiple DMRSs having phase continuity across the set of multiple TTIs based on a time duration between a beginning of the first resource and a next uplink shared channel transmission of the set of multiple uplink shared channel transmissions satisfying a threshold time interval. In some examples, the threshold time interval includes a quantity of symbol periods.

In some examples, to support receiving, the uplink receiving manager 1545 may be configured as or otherwise support a means for receiving a first subset of the set of multiple DMRSs having a first phase coherency and a second subset of the set of multiple DMRSs having a second phase coherency based on a time duration between a beginning of the first resource and a next uplink shared channel transmission of the set of multiple uplink shared channel transmissions not satisfying a threshold time interval.

In some examples, the first subset of the set of multiple DMRSs are received prior to the first resource. In some examples, the second subset of the set of multiple DMRSs are received subsequent to the first resource.

In some examples, to support receiving, the uplink receiving manager 1545 may be configured as or otherwise support a means for receiving a first subset of the set of multiple DMRSs having a first phase coherency and a second subset of the set of multiple DMRSs having a second phase coherency based on the first resource including one or more symbols allocated for one of the set of multiple DMRSs.

In some examples, the one or more symbols allocated for the set of multiple DMRSs include all symbols allocated for the set of multiple DMRSs within a TTI of the set of multiple TTIs.

In some examples, to support receiving, the uplink receiving manager 1545 may be configured as or otherwise support a means for receiving the subset of the set of multiple DMRSs having phase coherency across the set of multiple TTIs based on the first resource not including any symbols allocated for the set of multiple DMRSs.

In some examples, the UE capability receiving manager 1555 may be configured as or otherwise support a means for receiving, from the UE, an indication of one or more phase-continuity conditions supported by the UE, where transmitting the control message, determining the one or more phase-continuity conditions, or both, is based on receiving the indication of one or more phase-continuity conditions supported by the UE.

In some examples, the set of multiple resources, for each TTI of the set of multiple TTIs, includes a first subset of resources allocated for the set of multiple uplink shared channel transmissions and second subset of resources allocated for the set of multiple DMRSs.

In some examples, the set of multiple uplink shared channel transmissions include a set of multiple repetitions of a same uplink shared channel transmission. In some examples, the set of multiple uplink shared channel transmissions include a first uplink shared channel transmission and a second uplink shared channel transmission different from the first uplink shared channel transmission.

In some examples, the channel estimation manager 1560 may be configured as or otherwise support a means for determining a channel estimate based on aggregating the subset of the set of multiple DMRSs. In some examples, the demodulation manager 1565 may be configured as or otherwise support a means for demodulating the subset of the set of multiple uplink shared channel transmissions based on the channel estimate.

Figure 16:
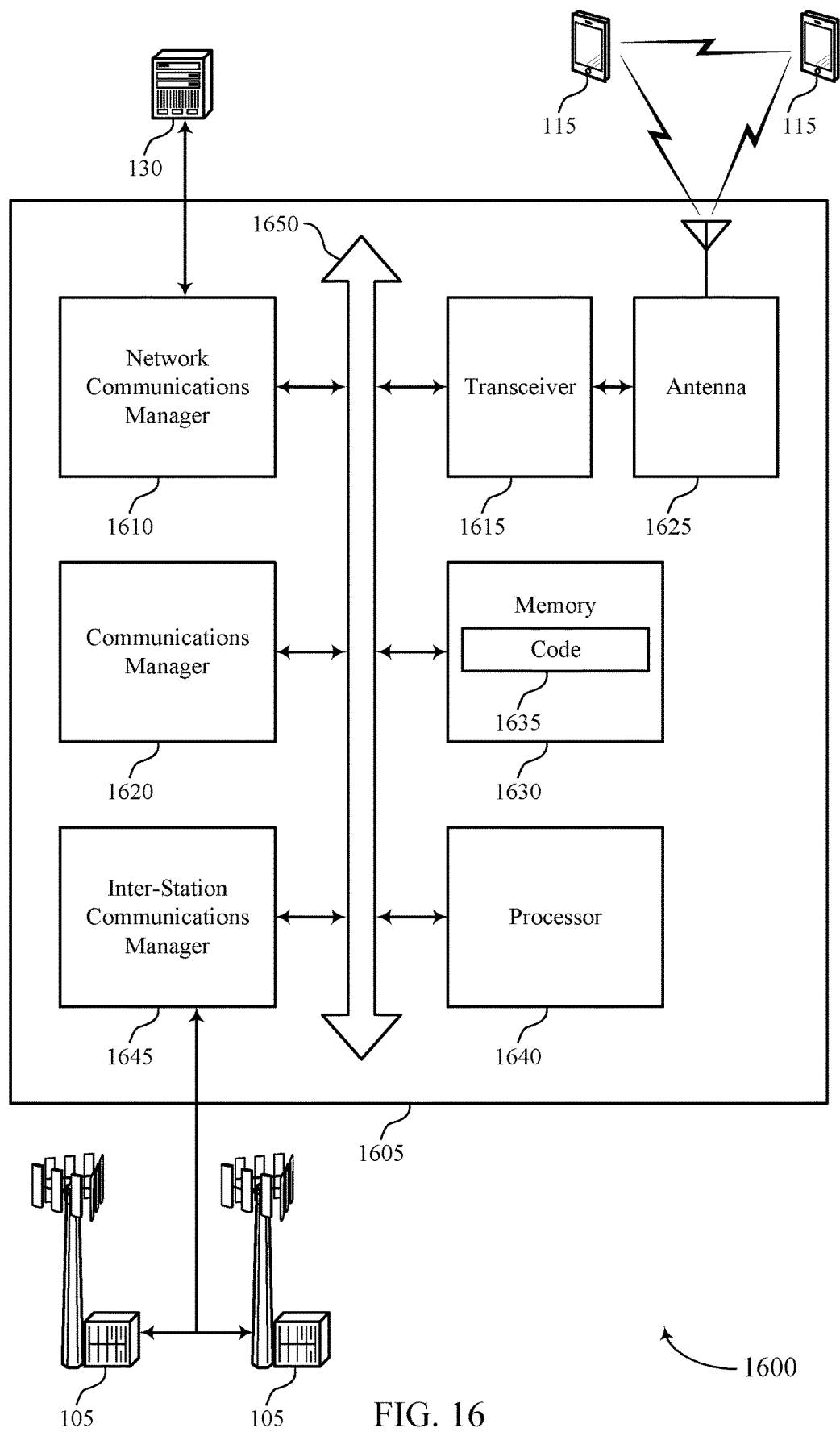
FIG. 16 shows a diagram of a system including a device that supports techniques for cross-slot channel estimation in accordance with aspects of the present disclosure.

FIG. 16 shows a diagram of a system 1600 including a device 1605 that supports techniques for cross-slot channel estimation in accordance with aspects of the present disclosure. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting techniques for cross-slot channel estimation). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communication at a UE in accordance with examples as disclosed herein. For example, the communications manager 1620 may be configured as or otherwise support a means for receiving, from a base station, control signaling indicating a set of multiple resources for transmitting a set of multiple uplink shared channel transmissions and a set of multiple DMRSs having phase continuity across a set of multiple TTIs. The communications manager 1620 may be configured as or otherwise support a means for receiving, from the base station, a control message indicating a cancellation of a first resource of the set of multiple resources. The communications manager 1620 may be configured as or otherwise support a means for determining one or more phase-continuity conditions for the set of multiple resources based on receiving the control message indicating the cancellation of the first resource. The communications manager 1620 may be configured as or otherwise support a means for transmitting, in one or more remaining resources of the set of multiple resources, at least a subset of the set of multiple uplink shared channel transmissions and at least a subset of the set of multiple DMRSs in accordance with the one or more phase-continuity conditions.

Additionally or alternatively, the communications manager 1620 may support wireless communication at a base station in accordance with examples as disclosed herein. For example, the communications manager 1620 may be configured as or otherwise support a means for transmitting, to a UE, control signaling indicating a set of multiple resources for transmitting a set of multiple uplink shared channel transmissions and a set of multiple DMRSs having phase continuity across a set of multiple TTIs. The communications manager 1620 may be configured as or otherwise support a means for transmitting, to the UE, a control message indicating a cancellation of a first resource of the set of multiple resources. The communications manager 1620 may be configured as or otherwise support a means for determining one or more phase-continuity conditions for the set of multiple resources based on transmitting the control message indicating the cancellation of the first resource. The communications manager 1620 may be configured as or otherwise support a means for receiving, in one or more remaining resources of the set of multiple resources, at least a subset of the set of multiple uplink shared channel transmissions and at least a subset of the set of multiple DMRSs in accordance with the one or more phase-continuity conditions.

By including or configuring the communications manager 1620 in accordance with examples as described herein, the device 1605 may support techniques for maintaining phase coherency across DMRSs bundled across multiple slots. In particular, techniques described herein may enable UEs 115 to maintain some level of phase coherency across DMRSs bundled across multiple slots in the event a portion of resources allocated for the DMRSs and/or other transmissions is revoked or canceled. As such, by enabling UEs 115 to maintain phase coherency across DMRSs bundled across multiple slots, techniques described herein may enable more widespread use of phase-coherent DMRSs, which may enable more accurate channel estimations at the base station 105, improve a reliability of wireless communications within the wireless communications system, and improve overall user experience.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of techniques for cross-slot channel estimation as described herein, or the processor 1640 and the memory 1630 may be otherwise configured to perform or support such operations.

Figure 17:
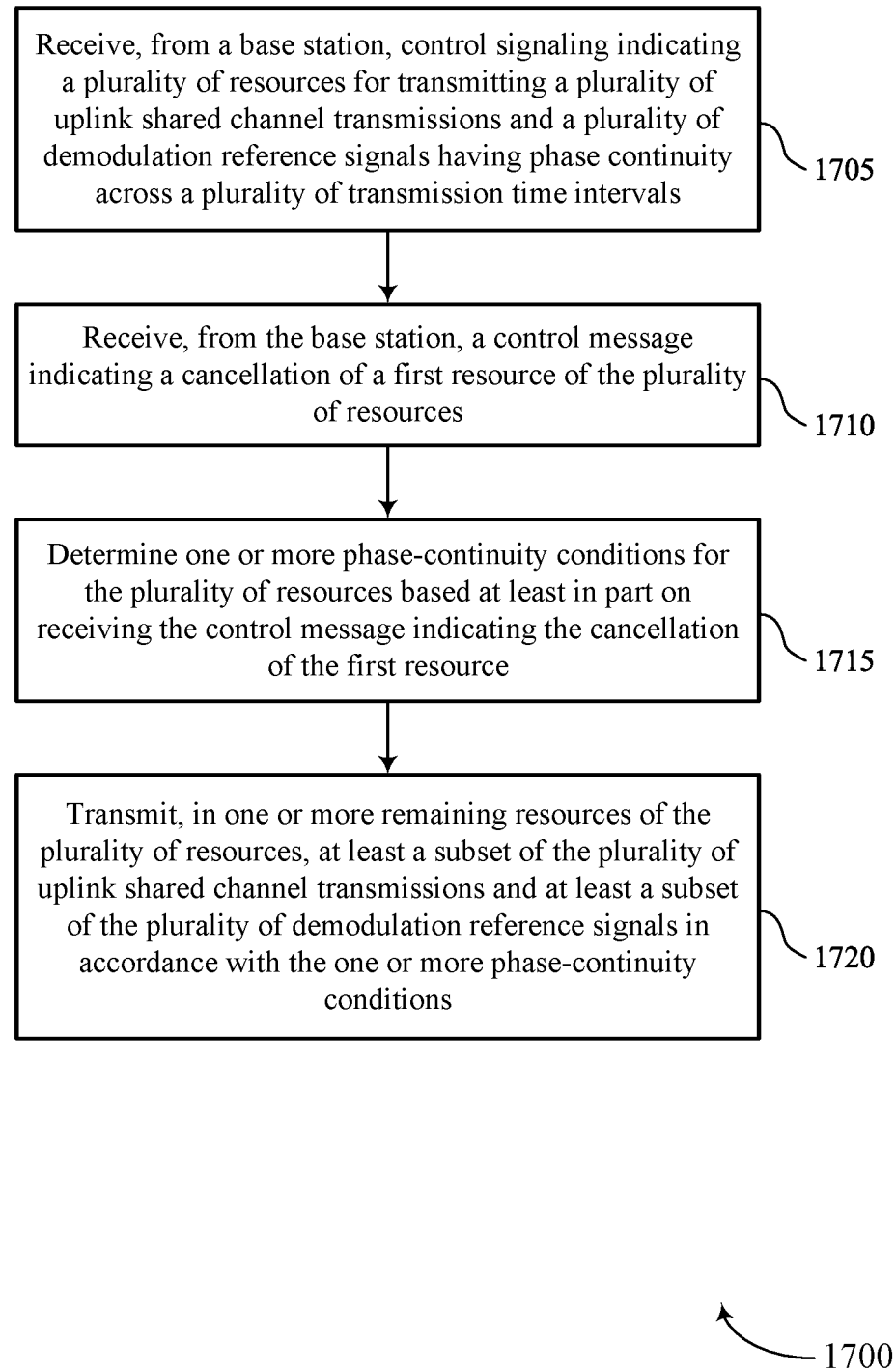
FIGS. 17 and 18 show flowcharts illustrating methods that support techniques for cross-slot channel estimation in accordance with aspects of the present disclosure.

FIG. 17 shows a flowchart illustrating a method 1700 that supports techniques for cross-slot channel estimation in accordance with aspects of the present disclosure. The operations of the method 1700 may be implemented by a base station or its components as described herein. For example, the operations of the method 1700 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 1705, the method may include receiving, from a base station, control signaling indicating a set of multiple resources for transmitting a set of multiple uplink shared channel transmissions and a set of multiple DMRSs having phase continuity across a set of multiple TTIs. The operations of 1705 may be performed in accordance with examples as disclosed herein. In some examples, aspects of the operations of 1705 may be performed by a control signaling receiving manager 1525 as described with reference to FIG. 15.

At 1710, the method may include receiving, from the base station, a control message indicating a cancellation of a first resource of the set of multiple resources. The operations of 1710 may be performed in accordance with examples as disclosed herein. In some examples, aspects of the operations of 1710 may be performed by a control signaling receiving manager 1525 as described with reference to FIG. 15.

At 1715, the method may include determining one or more phase-continuity conditions for the set of multiple resources based on receiving the control message indicating the cancellation of the first resource. The operations of 1715 may be performed in accordance with examples as disclosed herein. In some examples, aspects of the operations of 1715 may be performed by a phase-continuity manager 1530 as described with reference to FIG. 15.

At 1720, the method may include transmitting, in one or more remaining resources of the set of multiple resources, at least a subset of the set of multiple uplink shared channel transmissions and at least a subset of the set of multiple DMRSs in accordance with the one or more phase-continuity conditions. The operations of 1720 may be performed in accordance with examples as disclosed herein. In some examples, aspects of the operations of 1720 may be performed by an uplink transmitting manager 1535 as described with reference to FIG. 15.

Figure 18:
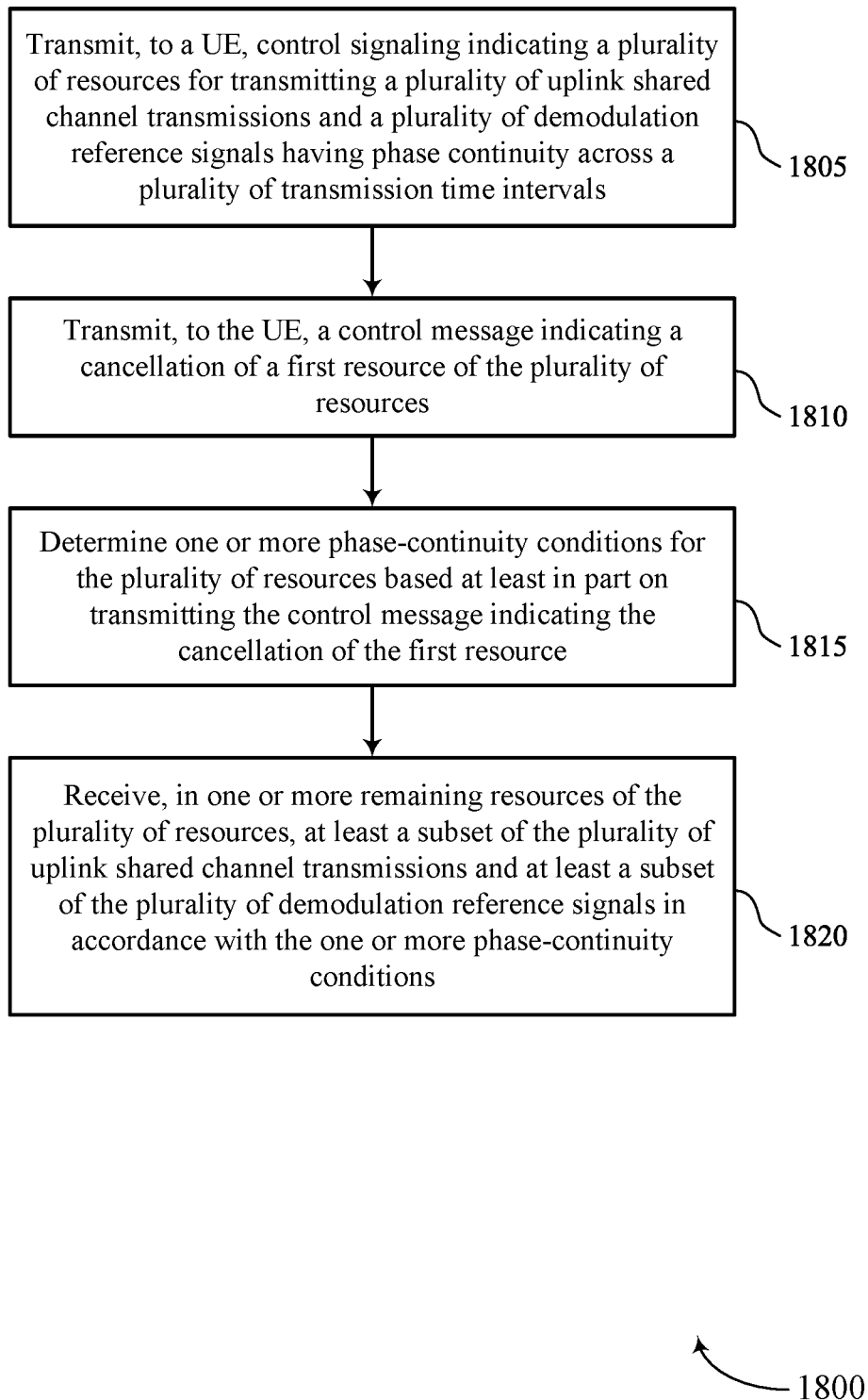

FIG. 18 shows a flowchart illustrating a method 1800 that supports techniques for cross-slot channel estimation in accordance with aspects of the present disclosure. The operations of the method 1800 may be implemented by a base station or its components as described herein. For example, the operations of the method 1800 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, control signaling indicating a set of multiple resources for transmitting a set of multiple uplink shared channel transmissions and a set of multiple demodulation reference signals having phase continuity across a set of multiple transmission time intervals. The operations of 1805 may be performed in accordance with examples as disclosed herein. In some examples, aspects of the operations of 1805 may be performed by a control signaling transmitting manager 1525 as described with reference to FIG. 15.

At 1810, the method may include transmitting, to the UE, a control message indicating a cancellation of a first resource of the set of multiple resources. The operations of 1810 may be performed in accordance with examples as disclosed herein. In some examples, aspects of the operations of 1810 may be performed by a control signaling transmitting manager 1525 as described with reference to FIG. 15.

At 1815, the method may include determining one or more phase-continuity conditions for the set of multiple resources based on transmitting the control message indicating the cancellation of the first resource. The operations of 1815 may be performed in accordance with examples as disclosed herein. In some examples, aspects of the operations of 1815 may be performed by a phase-continuity manager 1530 as described with reference to FIG. 15.

At 1820, the method may include receiving, in one or more remaining resources of the set of multiple resources, at least a subset of the set of multiple uplink shared channel transmissions and at least a subset of the set of multiple demodulation reference signals in accordance with the one or more phase-continuity conditions. The operations of 1820 may be performed in accordance with examples as disclosed herein. In some examples, aspects of the operations of 1820 may be performed by an uplink receiving manager 1535 as described with reference to FIG. 15.

The following provides an overview of aspects of the present disclosure:

Aspect 1: A method for wireless communication at a UE, comprising: receiving, from a base station, control signaling indicating a plurality of resources for transmitting a plurality of uplink shared channel transmissions and a plurality of DMRSs having phase continuity across a plurality of TTIs; receiving, from the base station, a control message indicating a cancellation of a first resource of the plurality of resources; determining one or more phase-continuity conditions for the plurality of resources based at least in part on receiving the control message indicating the cancellation of the first resource; and transmitting, in one or more remaining resources of the plurality of resources, at least a subset of the plurality of uplink shared channel transmissions and at least a subset of the plurality of DMRSs in accordance with the one or more phase-continuity conditions.

Aspect 2: The method of aspect 1, further comprising: transmitting the subset of the plurality of DMRSs having phase continuity across the plurality of TTIs based at least in part on a time duration between a beginning of the first resource and a next uplink shared channel transmission of the plurality of uplink shared channel transmissions satisfying a threshold time interval.

Aspect 3: The method of aspect 2, wherein the threshold time interval comprises a quantity of symbol periods.

Aspect 4: The method of any of aspects 2 through 3, further comprising: receiving, from the base station, an indication of the threshold time interval.

Aspect 5: The method of any of aspects 2 through 4, further comprising: transmitting, to the base station, an indication of the threshold time interval.

Aspect 6: The method of any of aspects 1 through 5, wherein the transmitting further comprises: transmitting a first subset of the plurality of DMRSs having a first phase coherency and a second subset of the plurality of DMRSs having a second phase coherency based at least in part on a time duration between a beginning of the first resource and a next uplink shared channel transmission of the plurality of uplink shared channel transmissions not satisfying a threshold time interval.

Aspect 7: The method of aspect 6, wherein the first subset of the plurality of DMRSs are transmitted prior to the first resource, and the second subset of the plurality of DMRSs are transmitted subsequent to the first resource.

Aspect 8: The method of any of aspects 1 through 7, wherein the transmitting further comprises: transmitting a first subset of the plurality of DMRSs having a first phase coherency and a second subset of the plurality of DMRSs having a second phase coherency based at least in part on the first resource including one or more symbols allocated for one of the plurality of DMRSs.

Aspect 9: The method of aspect 8, wherein the one or more symbols allocated for the plurality of DMRSs comprise all symbols allocated for the plurality of DMRSs within a TTI of the plurality of TTIs.

Aspect 10: The method of any of aspects 1 through 9, wherein the transmitting further comprises: transmitting the subset of the plurality of DMRSs having phase coherency across the plurality of TTIs based at least in part on the first resource not including any symbols allocated for the plurality of DMRSs.

Aspect 11: The method of any of aspects 1 through 10, further comprising: transmitting, to the base station, an indication of one or more phase-continuity conditions supported by the UE, wherein receiving the control message, determining the one or more phase-continuity conditions, or both, is based at least in part on transmitting the indication of one or more phase-continuity conditions supported by the UE.

Aspect 12: The method of any of aspects 1 through 11, wherein the plurality of resources, for each TTI of the plurality of TTIs, comprises a first subset of resources allocated for the plurality of uplink shared channel transmissions and second subset of resources allocated for the plurality of DMRSs.

Aspect 13: The method of any of aspects 1 through 12, wherein the plurality of uplink shared channel transmissions comprise a plurality of repetitions of a same uplink shared channel transmission.

Aspect 14: The method of any of aspects 1 through 13, wherein the plurality of uplink shared channel transmissions comprise a first uplink shared channel transmission and a second uplink shared channel transmission different from the first uplink shared channel transmission.

Aspect 15: The method of any of aspects 1 through 14, wherein the plurality of TTIs comprises a plurality of slots.

Aspect 16: The method of any of aspects 1 through 15, wherein the control message indicating the cancellation comprises an uplink cancellation indication message.

Aspect 17: A method for wireless communication at a base station, comprising: transmitting, to a UE, control signaling indicating a plurality of resources for transmitting a plurality of uplink shared channel transmissions and a plurality of DMRSs having phase continuity across a plurality of TTIs; transmitting, to the UE, a control message indicating a cancellation of a first resource of the plurality of resources; determining one or more phase-continuity conditions for the plurality of resources based at least in part on transmitting the control message indicating the cancellation of the first resource; and receiving, in one or more remaining resources of the plurality of resources, at least a subset of the plurality of uplink shared channel transmissions and at least a subset of the plurality of DMRSs in accordance with the one or more phase-continuity conditions.

Aspect 18: The method of aspect 17, further comprising: receiving the subset of the plurality of DMRSs having phase continuity across the plurality of TTIs based at least in part on a time duration between a beginning of the first resource and a next uplink shared channel transmission of the plurality of uplink shared channel transmissions satisfying a threshold time interval.

Aspect 19: The method of aspect 18, wherein the threshold time interval comprises a quantity of symbol periods.

Aspect 20: The method of any of aspects 18 through 19, further comprising: transmitting, to the UE, an indication of the threshold time interval.

Aspect 21: The method of any of aspects 18 through 20, further comprising: receiving, from the UE, an indication of the threshold time interval.

Aspect 22: The method of any of aspects 17 through 21, wherein the receiving further comprises: receiving a first subset of the plurality of DMRSs having a first phase coherency and a second subset of the plurality of DMRSs having a second phase coherency based at least in part on a time duration between a beginning of the first resource and a next uplink shared channel transmission of the plurality of uplink shared channel transmissions not satisfying a threshold time interval.

Aspect 23: The method of aspect 22, wherein the first subset of the plurality of DMRSs are received prior to the first resource, and the second subset of the plurality of DMRSs are received subsequent to the first resource.

Aspect 24: The method of any of aspects 17 through 23, wherein the receiving further comprises: receiving a first subset of the plurality of DMRSs having a first phase coherency and a second subset of the plurality of DMRSs having a second phase coherency based at least in part on the first resource including one or more symbols allocated for one of the plurality of DMRSs.

Aspect 25: The method of aspect 24, wherein the one or more symbols allocated for the plurality of DMRSs comprise all symbols allocated for the plurality of DMRSs within a TTI of the plurality of TTIs.

Aspect 26: The method of any of aspects 17 through 25, wherein the receiving further comprises: receiving the subset of the plurality of DMRSs having phase coherency across the plurality of TTIs based at least in part on the first resource not including any symbols allocated for the plurality of DMRSs.

Aspect 27: The method of any of aspects 17 through 26, further comprising: receiving, from the UE, an indication of one or more phase-continuity conditions supported by the UE, wherein transmitting the control message, determining the one or more phase-continuity conditions, or both, is based at least in part on receiving the indication of one or more phase-continuity conditions supported by the UE.

Aspect 28: The method of any of aspects 17 through 27, wherein the plurality of resources, for each TTI of the plurality of TTIs, comprises a first subset of resources allocated for the plurality of uplink shared channel transmissions and second subset of resources allocated for the plurality of DMRSs.

Aspect 29: The method of any of aspects 17 through 28, wherein the plurality of uplink shared channel transmissions comprise a plurality of repetitions of a same uplink shared channel transmission, or the plurality of uplink shared channel transmissions comprise a first uplink shared channel transmission and a second uplink shared channel transmission different from the first uplink shared channel transmission.

Aspect 30: The method of any of aspects 17 through 29, further comprising: determining a channel estimate based at least in part on aggregating the subset of the plurality of DMRSs; and demodulating the subset of the plurality of uplink shared channel transmissions based at least in part on the channel estimate.

Aspect 31: An apparatus for wireless communication at a UE, comprising a processor; memory coupled with the processor; and instructions stored in the memory and executable by the processor to cause the apparatus to perform a method of any of aspects 1 through 16.

Aspect 32: An apparatus for wireless communication at a UE, comprising at least one means for performing a method of any of aspects 1 through 16.

Aspect 33: A non-transitory computer-readable medium storing code for wireless communication at a UE, the code comprising instructions executable by a processor to perform a method of any of aspects 1 through 16.

Aspect 34: An apparatus for wireless communication at a base station, comprising a processor; memory coupled with the processor; and instructions stored in the memory and executable by the processor to cause the apparatus to perform a method of any of aspects 17 through 30.

Aspect 35: An apparatus for wireless communication at a base station, comprising at least one means for performing a method of any of aspects 17 through 30.

Aspect 36: A non-transitory computer-readable medium storing code for wireless communication at a base station, the code comprising instructions executable by a processor to perform a method of any of aspects 17 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a base station, control signaling indicating a plurality of resources for transmitting a plurality of uplink shared channel transmissions and a plurality of demodulation reference signals having phase continuity across a plurality of transmission time intervals;
   receiving, from the base station, a control message indicating a cancellation of a first resource of the plurality of resources;
   determining one or more phase continuity conditions for the plurality of resources based at least in part on receiving the control message indicating the cancellation of the first resource; and
   transmitting, in accordance with the one or more phase continuity conditions and in one or more remaining resources of the plurality of resources, at least a subset of the plurality of uplink shared channel transmissions, a first subset of the plurality of demodulation reference signals having a first phase continuity, and a second subset of the plurality of demodulation reference signals having a second phase continuity based at least in part on the first resource including one or more symbols allocated for uplink shared channel transmission.

2. The method of claim 1, further comprising:
   transmitting the first subset of the plurality of demodulation reference signals and the second subset of the plurality of demodulation reference signals having phase continuity across the plurality of transmission time intervals based at least in part on a time duration between a beginning of the first resource and a next uplink shared channel transmission of the plurality of uplink shared channel transmissions satisfying a threshold time interval.

3. The method of claim 2, wherein the threshold time interval comprises a quantity of symbol periods.

4. The method of claim 2, further comprising:
   receiving, from the base station, an indication of the threshold time interval.

5. The method of claim 2, further comprising:
   transmitting, to the base station, an indication of the threshold time interval.

6. The method of claim 1, wherein the transmitting further comprises:
   transmitting the first subset of the plurality of demodulation reference signals having the first phase continuity and the second subset of the plurality of demodulation reference signals having the second phase continuity based at least in part on a time duration between a beginning of the first resource and a next uplink shared channel transmission of the plurality of uplink shared channel transmissions not satisfying a threshold time interval.

7. The method of claim 6, wherein the first subset of the plurality of demodulation reference signals are transmitted prior to the first resource, and wherein the second subset of the plurality of demodulation reference signals are transmitted subsequent to the first resource.

8. The method of claim 1, wherein the transmitting further comprises:
   transmitting the first subset of the plurality of demodulation reference signals having the first phase continuity and the second subset of the plurality of demodulation reference signals having the second phase continuity based at least in part on the first resource including one or more symbols allocated for one of the plurality of demodulation reference signals.

9. The method of claim 8, wherein the one or more symbols allocated for the plurality of demodulation reference signals comprise all symbols allocated for the plurality of demodulation reference signals within a transmission time interval of the plurality of transmission time intervals.

10. The method of claim 1, wherein the transmitting further comprises:
    transmitting the first subset of the plurality of demodulation reference signals and the second subset of the plurality of demodulation reference signals having phase continuity across the plurality of transmission time intervals based at least in part on the first resource not including any symbols allocated for the plurality of demodulation reference signals.

11. The method of claim 1, further comprising:
    transmitting, to the base station, an indication of one or more phase continuity conditions supported by the UE, wherein receiving the control message, determining the one or more phase continuity conditions, or both, is based at least in part on transmitting the indication of one or more phase continuity conditions supported by the UE.

12. The method of claim 1, wherein the plurality of resources, for each transmission time interval of the plurality of transmission time intervals, comprises a first subset of resources allocated for the plurality of uplink shared channel transmissions and a second subset of resources allocated for the plurality of demodulation reference signals.

13. The method of claim 1, wherein the plurality of uplink shared channel transmissions comprise a plurality of repetitions of a same uplink shared channel transmission.

14. The method of claim 1, wherein the plurality of uplink shared channel transmissions comprise a first uplink shared channel transmission scheduled via a first scheduling grant, and a second uplink shared channel transmission scheduled by a second scheduling grant which is different from the first scheduling grant.

15. The method of claim 1, wherein the plurality of transmission time intervals comprises a plurality of slots.

16. The method of claim 1, wherein the control message indicating the cancellation comprises an uplink cancellation indication message.

17. A method for wireless communication at a base station, comprising:
   transmitting, to a user equipment (UE), control signaling indicating a plurality of resources for transmitting a plurality of uplink shared channel transmissions and a plurality of demodulation reference signals having phase continuity across a plurality of transmission time intervals;
   transmitting, to the UE, a control message indicating a cancellation of a first resource of the plurality of resources;
   determining one or more phase continuity conditions for the plurality of resources based at least in part on transmitting the control message indicating the cancellation of the first resource; and
   receiving, in accordance with the one or more phase continuity conditions and in one or more remaining resources of the plurality of resources, at least a subset of the plurality of uplink shared channel transmissions, a first subset of the plurality of demodulation reference signals having a first phase continuity, and a second subset of the plurality of demodulation reference signals having a second phase continuity based at least in part on the first resource including one or more symbols allocated for uplink shared channel transmission.

18. The method of claim 17, further comprising:
   receiving the first subset of the plurality of demodulation reference signals and the second subset of the plurality of demodulation reference signals having phase continuity across the plurality of transmission time intervals based at least in part on a time duration between a beginning of the first resource and a next uplink shared channel transmission of the plurality of uplink shared channel transmissions satisfying a threshold time interval.

19. The method of claim 18, wherein the threshold time interval comprises a quantity of symbol periods.

20. The method of claim 17, wherein the receiving further comprises:
   receiving the first subset of the plurality of demodulation reference signals having the first phase continuity and the second subset of the plurality of demodulation reference signals having the second phase continuity based at least in part on a time duration between a beginning of the first resource and a next uplink shared channel transmission of the plurality of uplink shared channel transmissions not satisfying a threshold time interval.

21. The method of claim 20, wherein the first subset of the plurality of demodulation reference signals are received prior to the first resource, and wherein the second subset of the plurality of demodulation reference signals are received subsequent to the first resource.

22. The method of claim 17, wherein the receiving further comprises:
   receiving the first subset of the plurality of demodulation reference signals having the first phase continuity and the second subset of the plurality of demodulation reference signals having the second phase continuity based at least in part on the first resource including one or more symbols allocated for one of the plurality of demodulation reference signals.

23. The method of claim 22, wherein the one or more symbols allocated for the plurality of demodulation reference signals comprise all symbols allocated for the plurality of demodulation reference signals within a transmission time interval of the plurality of transmission time intervals.

24. The method of claim 17, wherein the receiving further comprises:
   receiving the first subset of the plurality of demodulation reference signals and the second subset of the plurality of demodulation reference signals having phase continuity across the plurality of transmission time intervals based at least in part on the first resource not including any symbols allocated for the plurality of demodulation reference signals.

25. The method of claim 17, further comprising:
   receiving, from the UE, an indication of one or more phase continuity conditions supported by the UE, wherein transmitting the control message, determining the one or more phase continuity conditions, or both, is based at least in part on receiving the indication of one or more phase continuity conditions supported by the UE.

26. The method of claim 17, wherein the plurality of resources, for each transmission time interval of the plurality of transmission time intervals, comprises a first subset of resources allocated for the plurality of uplink shared channel transmissions and a second subset of resources allocated for the plurality of demodulation reference signals.

27. The method of claim 17, wherein: the plurality of uplink shared channel transmissions comprise a plurality of repetitions of a same uplink shared channel transmission, or wherein the plurality of uplink shared channel transmissions comprise a first uplink shared channel transmission and a second uplink shared channel transmission different from the first uplink shared channel transmission.

28. The method of claim 17, further comprising:
   determining a channel estimate based at least in part on aggregating the subset of the plurality of demodulation reference signals; and
   demodulating the subset of the plurality of uplink shared channel transmissions based at least in part on the channel estimate.

29. An apparatus for wireless communication at a user equipment (UE), comprising:
   a processor;
   memory coupled with the processor; and
   instructions stored in the memory and executable by the processor to cause the apparatus to:
      receive, from a base station, control signaling indicating a plurality of resources for transmitting a plurality of uplink shared channel transmissions and a plurality of demodulation reference signals having phase continuity across a plurality of transmission time intervals;
      receive, from the base station, a control message indicating a cancellation of a first resource of the plurality of resources;
      determine one or more phase continuity conditions for the plurality of resources based at least in part on receiving the control message indicating the cancellation of the first resource; and
      transmit, in accordance with the one or more phase continuity conditions and in one or more remaining resources of the plurality of resources, at least a subset of the plurality of uplink shared channel transmissions, a first subset of the plurality of demodulation reference signals having a first phase continuity, and a second subset of the plurality of demodulation reference signals having a second phase continuity based at least in part on the first resource including one or more symbols allocated for uplink shared channel transmission.

30. An apparatus for wireless communication at a base station, comprising:

a processor;

memory coupled with the processor; and instructions stored in the memory and executable by the processor to cause the apparatus to:

transmit, to a user equipment (UE), control signaling indicating a plurality of resources for transmitting a plurality of uplink shared channel transmissions and a plurality of demodulation reference signals having phase continuity across a plurality of transmission time intervals;

transmit, to the UE, a control message indicating a cancellation of a first resource of the plurality of resources;

determine one or more phase continuity conditions for the plurality of resources based at least in part on transmitting the control message indicating the cancellation of the first resource; and receive, in accordance with the one or more phase continuity conditions and in one or more remaining resources of the plurality of resources, at least a subset of the plurality of uplink shared channel transmissions, a first subset of the plurality of demodulation reference signals having a first phase continuity, and a second subset of the plurality of demodulation reference signals having a second phase continuity based at least in part on the first resource including one or more symbols allocated for uplink shared channel transmission.

* * * * *